United States Patent
Pemberton et al.

(10) Patent No.: US 12,205,580 B1
(45) Date of Patent: Jan. 21, 2025

(54) NATURAL LANGUAGE INPUT ROUTING

(71) Applicant: Amazon Technologies, Inc., Seattle, WA (US)

(72) Inventors: Joe Pemberton, Seattle, WA (US); Michael Schwartz, Seattle, WA (US); Vijitha Raji, Sammamish, WA (US); Archit Jain, Seattle, WA (US); Tara Raj, Seattle, WA (US); Alexander Go, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 237 days.

(21) Appl. No.: 17/036,617

(22) Filed: Sep. 29, 2020

(51) Int. Cl.
 *G10L 15/22* (2006.01)

(52) U.S. Cl.
 CPC ........ *G10L 15/22* (2013.01); *G10L 2015/221* (2013.01); *G10L 2015/223* (2013.01)

(58) Field of Classification Search
 None
 See application file for complete search history.

(56) References Cited

U.S. PATENT DOCUMENTS

| | | | |
|---|---|---|---|
| 10,490,187 B2 * | 11/2019 | Laurens | G06F 3/167 |
| 2014/0278413 A1 * | 9/2014 | Pitschel | G10L 15/22 |
| | | | 704/243 |
| 2017/0278514 A1 * | 9/2017 | Mathias | G06F 16/35 |
| 2017/0357637 A1 * | 12/2017 | Nell | G06F 40/35 |
| 2018/0173403 A1 * | 6/2018 | Carbune | G06F 3/04817 |
| 2018/0260680 A1 * | 9/2018 | Finkelstein | G06N 5/04 |
| 2021/0027485 A1 * | 1/2021 | Zhang | G06T 7/11 |
| 2021/0074285 A1 * | 3/2021 | Golikov | G10L 15/063 |
| 2021/0342194 A1 * | 11/2021 | Zhang | G06F 9/5038 |
| 2022/0028379 A1 * | 1/2022 | Carbune | G10L 15/22 |

* cited by examiner

*Primary Examiner* — Seong-Ah A Shin
(74) *Attorney, Agent, or Firm* — Pierce Atwood LLP

(57) ABSTRACT

Techniques for selecting a skill component to process a natural language input are described. When a natural language input is received, natural language understanding (NLU) output data representing the natural language input is generated, and skill components (capable of processing the NLU output data) are determined. Thereafter, rules (for preventing the invocation of skill components) are implemented in a tiered manner, resulting in the determination of a subset of the skill components. The subset of skill components is ranked using a machine learning model(s), and the top-ranked skill component is called to process the NLU output data.

18 Claims, 16 Drawing Sheets

NATURAL LANGUAGE INPUT ROUTING

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
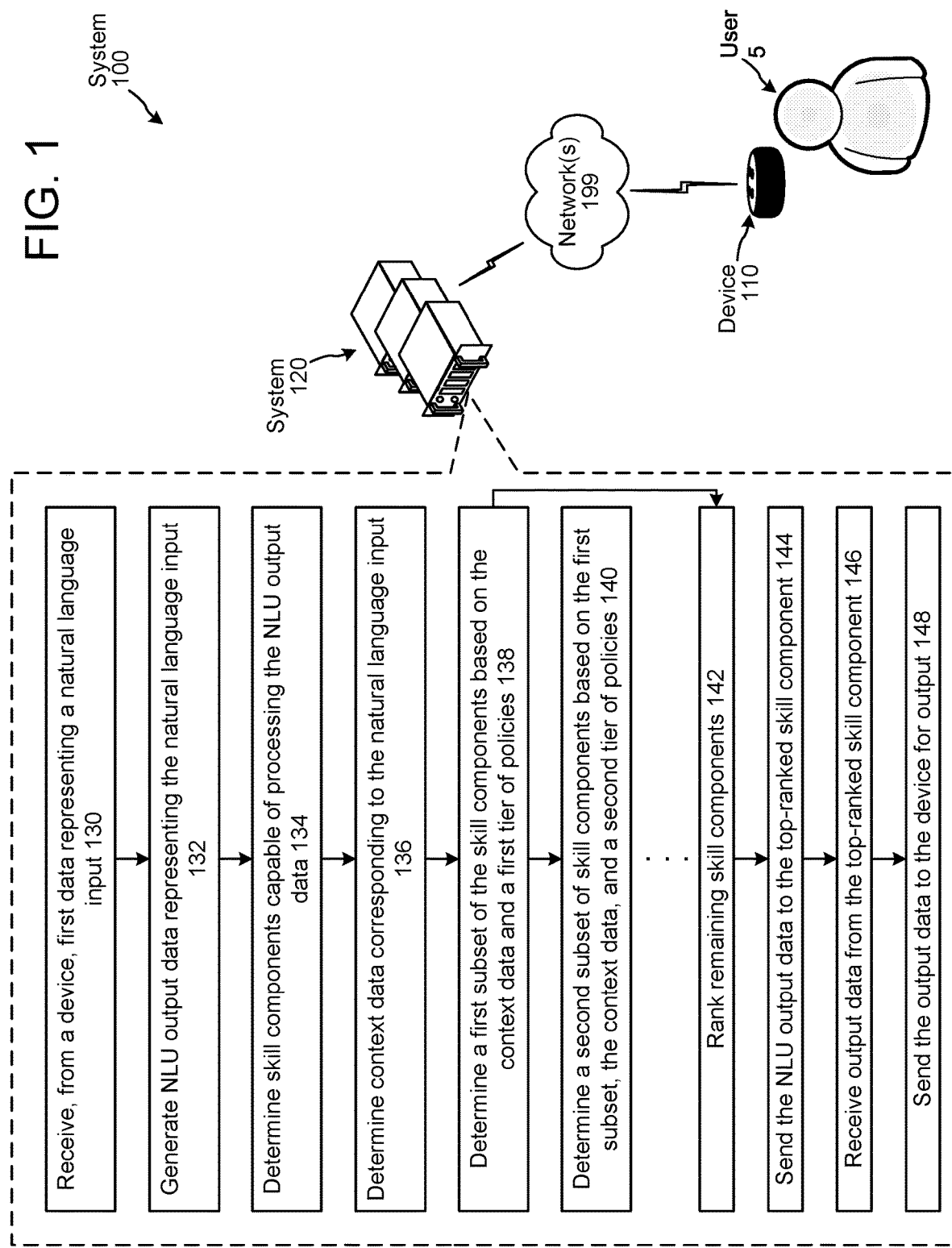
FIG. 1 is a conceptual diagram illustrating a system configured to select a skill component, at runtime, based at least in part on one or more rules, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech.

A system may cause actions to be performed in response to natural language inputs (e.g., spoken inputs and text inputs, such as typed inputs). For example, for the natural language input "play music by <artist>," a system may output music sung by the indicated artist. For further example, for the natural language input "turn on the lights," a system may turn on "smart" lights associated with a user's profile. In another example, for the natural language input "what is the weather," a system may output weather information for a geographic location corresponding to the device that captured the natural language input. In the foregoing examples, actions correspond to the outputting of music, the turning on of "smart" lights, and the outputting of weather information. As such, as used herein, an "action" may refer to some result of a system's processing.

When a user provides a natural language input to a device, the device may generate a representation of the natural language input, and send the representation to a system (e.g., a cloud-based system) configured to perform language processing (as well as other processing described herein). For example, the system may perform ASR processing on audio data to generate ASR output data, and may perform NLU processing on ASR output data (or text corresponding to a typed natural language input) to generate NLU output data (e.g., representing a likely intent of the natural language input and corresponding entities).

A system may implement (and/or be otherwise in communication with) one or more skill components. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using different terms, such as an action, bot, application, or the like.

In at least some instances, a system may implement (and/or be otherwise in communication with) two or more skill components configured to process with respect to a same NLU intent (e.g., <OutputWeather>, <PlayMusic>, <Play Video>, <TurnOff> smart lights, <Lock> smart door lock, etc.), resulting in more than one skill component being capable of being invoked with respect to a single natural language input.

The present disclosure provides, among other things, a mechanism for applying rules to select a skill component to process in response to a natural language input. As used herein, a "rule" is configured to enforce routing behavior under specific conditions (e.g., defined by contextual signals (such as device type, time of day, type of content being output when a natural language input is received, location, etc.), natural language input content, etc.). In other words, when the conditions defined in a rule are met, the rule may be applied to filter out skill components from consideration (i.e., prevent a skill component from processing a presently-being processed natural language input) and/or select a skill component.

Rules may be implemented as discrete tiers of rules. The tiers may be configured such that rules of one tier are given higher priority than rules of another tier. As such, the rules of the higher priority tier may be implemented prior to or instead of the rules of the lower priority tier. Moreover, the rules of the lower priority tier may only be implemented if a rule of the higher priority tier is not triggered. This allows for rule evaluation during runtime to be minimized to only rules that need to be evaluated to affect an intended routing of a natural language input to a skill component.

A rule may be a "blocking rule" that causes one or more skill components to be removed from consideration for purposes of determining which skill component to route a present natural language input to. Multiple blocking rules of a single tier may be applied simultaneously and may be implemented as additive in nature. As an example, a blocking rule may indicate skill components, that output video data, are to be blocked when the device that captured the present natural language input is a vehicle.

Alternatively, a rule may be a "selection rule" that causes every skill component, except a skill component(s) corresponding to the selection rule, to be removed from consideration for purposes of determining which skill component to route a natural language input to. Whereas a selection rule blocks all skill components except a particular skill component(s) associated with the selection rule, a blocking rule may be used to block a class of skill components without the purpose of selecting any particular skill component(s). When a tier contains a triggered selection rule, rules of other tiers may not be processed. However, if one or more blocking rules of a tier are triggered, but no selection rule of the tier is triggered, rules of other tiers may still be implemented.

The teachings herein improve the user experience by increasing a likelihood that a natural language input will be processed by an intended skill component.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 shows a system 100 configured to select a skill component, at runtime, based at least in part on one or more rules. Although the figures and discussion of the present disclosure illustrate certain steps in a particular order, the steps described may be performed in a different order (as well as certain steps removed or added) without departing from the present disclosure. As shown in FIG. 1, the system 100 may include a device 110 (local to a user 5) in communication with a system 120 across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

The device 110 may receive audio corresponding to a spoken natural language input from the user 5. The device 110 may generate audio data representing the audio, and may send the audio data to the system 120. Alternatively, the device 110 may receive a text-based (e.g., typed) natural language input from the user 5. The device 110 may generate text data representing the text-based natural language input, and may send the text data to the system 120. Alternatively, the device 110 may include or be in communication with a camera that captures a sequence of images representing the user 5 performing a gesture. In these instances, the device 110 may send image data (representing the sequence of images) and/or an indication of the gesture performed to the system 120 (and the system 120 may determine stored data representing the gesture corresponds to a particular natural language input). Alternatively, the device 110 may include or be in communication with a motion sensor configured to detect motion. When the device 110 detects motion, the device 110 may send data representing the detected motion to the system 120 (and the system 120 may determine stored data representing activation of the motion sensor corresponds to a particular natural language input). Alternatively, the device 110 may include a button or display a virtual button, and the device 110 may detect the user 5 interacting with the button in a particular manner (e.g., a single quick press, a single long press, a double tap, a roaming touch input in a particular direction, etc.). The device 110 may send data representing the detected button interaction to the system 120 (and the system may determine data representing the particular button interaction corresponds to a particular natural language input).

The system 120 receives (130), from the device 110 via the network(s) 199, first data representing a natural language input. For example, the system 120 may receive audio data representing a spoken natural language input, text data representing the text-based natural language input, image data representing the performance of a gesture, motion sensor data representing detected motion, or data representing interaction with/selection of a button. When the system 120 receives the image data, motion sensor data, or data representing interaction with/selection of a button, the system 120 may determine stored data (first data) representing the received data corresponds to a particular natural language input.

The system 120 generates (132) NLU output data representing the natural language input. In the example wherein the system 120 receives audio data representing a spoken natural language input, the system 120 may perform ASR processing on the audio data to generate ASR output data, and may perform NLU processing on the ASR output data to generate the NLU output data. Alternatively, the system 120 may perform spoken language understanding (SLU) processing on the audio data to generate the NLU output data. In the example where the system 120 receives text data representing a text-based natural language input, the system 120 may perform NLU processing on the text data to generate the NLU output data. In the example where the system 120 receives image data, the system 120 may process the image data to determine a performed gesture, and may determine stored NLU output data associated with the performed gesture. In the example where the system 120 receives data representing a detected gesture, the system 120 may determine stored NLU output data associated with the gesture. In the example where the system 120 receives motion sensor data, the system 120 may determine stored NLU output data associated with the detected motion represented in the motion sensor data. In the example where the system 120 receives data representing interaction with a button, the system 120 may determine stored NLU output data associated with the specific type of interaction.

After generating the NLU output data, the system 120 determines (134) skill components (also referred to herein as processing components) capable of processing the NLU output data. In at least some embodiments, the system 120 may determine the skill components using skill component proposal rules. A skill component developer (via a skill component developer device) may provide the system 120 with rules data, corresponding to one or more rules, representing when the skill component developer's skill component should be invoked. In at least some embodiments, a skill component proposal rule may be specific to a NLU intent. A skill component proposal rule may also be specific to one or more entities capable of being identified by named entity recognition (NER) processing. A skill component proposal rule may additionally be specific to specific context data. For example, a skill component proposal rule may indicate context such as output capabilities of a device, a geographic location, an operation mode of a device (e.g., that a device needs to be enabled to be used for 1-way messaging functionality of the system 120, that a device needs to be enabled to be used for 2-way communication functionality of the system 120, that a device needs to be enabled to output announcement content, etc.), and/or other context data. The system may determine the skill components (capable of processing the NLU output data) based on determining skill component proposal rules of the skill components correspond to the NLU output data (and optionally other context data).

The system 120 determines (136) context data corresponding to the natural language input. For example, the context data may represent a type of the device 110, output capabilities of the device 110, time information (e.g., a present time of day, a present day of the week, a present month of the year, etc.), location information (e.g., a geographic location of the device 110), user profile information (e.g., a native language of the user 5, an age of the user 5, a nationality of the user 5, etc.), and/or other context data known in the art.

The system 120 may determine (140) a first subset of the skill components based on the context data and a first tier of rules. For example, the system 120 may determine one or more blocking rules (of the first tier) are associated with context information represented in the context data corresponding to the natural language input. Based thereon, the system 120 may determine one or more skill components blocked by the one or more blocking rules, and may determine the first subset of skill components to not include the blocked skill components.

After processing with respect to the first tier of rules, the system 120 may determine (140) a second subset of skill components based on the first subset of skill components, the context data, and a second tier of rules. For example, the system 120 may determine one or more blocking rules (of the second tier) are associated with context information represented in the context data corresponding to the natural language input. Based thereon, the system 120 may determine one or more skill components blocked by the one or more blocking rules, and may determine the second subset of skill components to include the skill components of the first subset except the skill components of the first subset blocked by the one or more blocking rules of the second tier of rules.

The system 120 may perform the foregoing rule processing with respect to n tiers of rules. Alternatively, the system 120 may only perform the foregoing rule processing with respect to the first tier of rules (e.g., in the situation where a selection rule of the first tier of rules is associated with context information corresponding to the context data corresponding to the natural language input). In at least some embodiments, the tiers of rules may represent a priority (or a hierarchy) in which the tiers of rules are to be processed/applied to the natural language input. For example, a first tier of rules may be associated with a higher priority than a second tier of rules, and the first tier of rules may be processed before the second tier of rules. Each tier may include one or more rules (e.g., a set of rules or a plurality of rules). In at least some embodiments, if a rule from the first tier is applicable to the natural language input, then the system 120 may not evaluate the second tier of rules.

In determining the first subset and second subset of skill components (per steps 138 and 140), the system 120 may be filtering skill components from all available skill components. After the system 120 is finished filtering the skill components using the one or more tiers of rules, the system 120 may rank (142) the remaining skill components. In ranking the remaining skill components, the system 120 may assign a respective confidence score to each remaining skill component, where the confidence score represents a confidence level that the skill component should process the NLU output data (e.g., the skill component is capable of processing the NLU output data, the skill component is available/online, all or some data needed by the skill component to perform processing is available, the skill component is a preferred skill, etc.). The system 120 may use a machine learned (ML) model to rank the remaining skill components, for example as described herein with respect to FIG. 12. In the situation where a selection rule of the first tier of rules is triggered, the system 120 may perform processing to determine a confidence score for the one skill component associated with the selection rule.

The system 120 may send (144) the NLU output data to the top-ranked skill component (based on the confidence scores). In at least some embodiments, the system 120 may only send the NLU output data to the top-ranked skill component (which may be a single ranked skill component in the case where a selection rule of the first tier was triggered) if the confidence score associated with the top-ranked skill component (or only ranked skill component) satisfies a condition (e.g., meets or exceeds a threshold confidence score).

The system 120 may receive (146) output data from the top-ranked skill component, and may send (148) the output data to the device 110 for output to the user 5. For example, the system 120 may perform TTS processing on the output data to generate audio data including synthesized speech, and may send the audio data to the device 110 to output the synthesized speech to the user 5.

Figure 2:
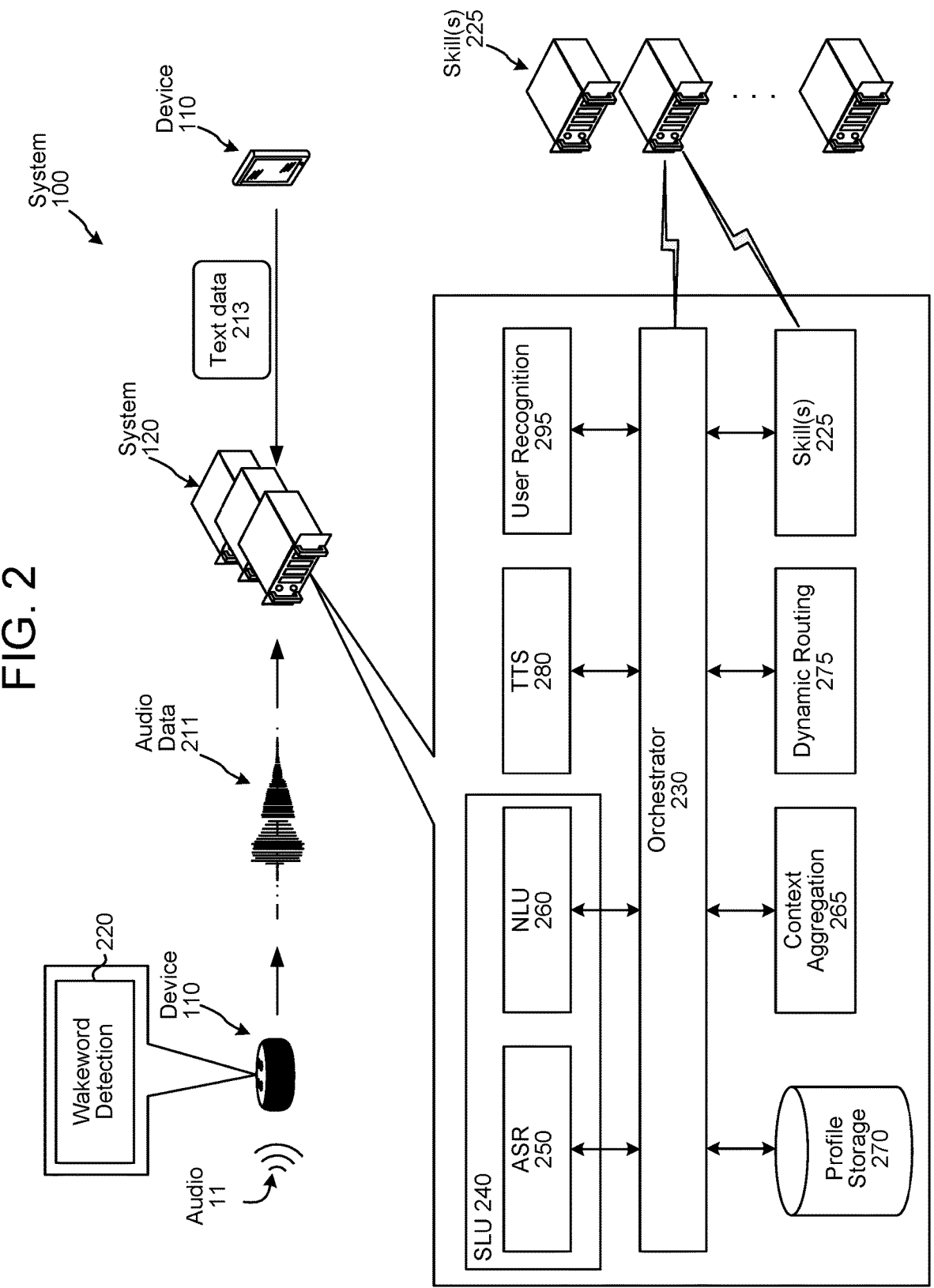
FIG. 2 is a conceptual diagram of components of a system, according to embodiments of the present disclosure.

The system 100 may operate using various components as illustrated in FIG. 2. The various components may be located on a same or different physical devices. Communication between various components may occur directly or across a network(s) 199.

A microphone or array of microphones (of or otherwise associated with a device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may determine if the speech is directed at the device 110/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio 11, to the system 120. The audio data 211 may include data corresponding to the detected wakeword, or the device 110 may remove the portion of the audio corresponding to the detected wakeword prior to sending the audio data 211 to the system 120.

The system 120 may include an orchestrator component 230 configured to, among other things, coordinate data transmissions between components of the system 120. The orchestrator component 230 may receive the audio data 211 from the device 110, and send the audio data 211 to an ASR component 250.

The ASR component 250 transcribes the audio data 211 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 211. Each ASR hypothesis may be associated with a score representing a confidence of ASR processing performed to determine the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In at least some instances, instead of the device 110 receiving audio 11, the device 110 may receive a text-based (e.g., typed) natural language input. The device 110 may determine text data 213 representing the typed natural language input, and may send the text data 213 to the system 120, wherein the text data 213 is received by the orchestrator component 230. The orchestrator component 230 may send the text data 213 or ASR output data output, depending on the type of natural language input received, to a NLU component 260. The NLU component 260 processes, as described herein with respect to FIGS. 4-5, to generate NLU output data.

As described above, the system 120 may perform speech processing using two different components (e.g., the ASR component 250 and the NLU component 260). In at least some embodiments, the system 120 may implement a spoken language understanding (SLU) component 255 configured to process audio data 211 to determine NLU output data.

The SLU component 255 may be equivalent to a combination of the ASR component 250 and the NLU component 260. Yet, the SLU component 255 may process audio data 211 and directly determine the NLU output data, without an intermediate step of generating ASR output data. As such, the SLU component 255 may take audio data 211 representing speech and attempt to make a semantic interpretation of the speech. That is, the SLU component 255 may determine a meaning associated with the speech and then implement that meaning. For example, the SLU component 255 may interpret audio data 211 representing speech from the user 5 in order to derive a desired action. The SLU component 255 may output a most likely NLU hypothesis, or multiple NLU hypotheses associated with respective confidence or other scores (such as probability scores, etc.).

The NLU component 260 (or the SLU component 255 depending on configuration of the system 120) may send the NLU output data to the orchestrator component 230. The orchestrator component 230 may send the NLU output data to a dynamic routing component 275 that processes, as described herein with respect to FIGS. 7-13, to determine a skill component 225 to process the NLU output data.

The system 120 may include or otherwise communicate with one or more skill components 225. A skill component 225 may be configured to execute with respect to NLU output data. For example, for an NLU hypothesis including a <GetWeather> intent, the system 120 (and more particularly the orchestrator component 230) may invoke a weather skill component to determine and output weather information for a geographic location represented in a user profile or corresponding to a location of the device 110 that captured the corresponding natural language input. For further example, for an NLU hypothesis including a <BookRide> intent, the system 120 (and more particularly the orchestrator component 230) may invoke a taxi skill component to book a requested ride. In another example, for an NLU hypothesis including a <BuyPizza> intent, the system 120 (and more particularly the orchestrator component 230) may invoke a restaurant skill component to place an order for a pizza. A skill component 225 may operate in conjunction between the system 120 and other devices, such as the device 110, restaurant electronic ordering systems, taxi electronic booking systems, etc. in order to complete certain functions. Inputs to a skill component 225 may come from speech processing interactions or through other interactions or input sources.

A skill component 225 may be associated with a domain, a non-limiting list of which includes a smart home domain, a music domain, a video domain, a weather domain, a communications domain, a flash briefing domain, a shopping domain, and a custom domain.

The system 120 may include a TTS component 280 that determine audio data (e.g., synthesized speech) from text data using one or more different methods. Text data input to the TTS component 280 may come from a skill, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to determine audio data including an artificial speech waveform. Parametric synthesis uses a computerized voice generator, sometimes called a vocoder.

The system 120 may include a user recognition component 295. The user recognition component 295 may recognize one or more users using various data. The user recognition component 295 may take as input the audio data 211. The user recognition component 295 may perform user recognition by comparing speech characteristics, in the audio data 211, to stored speech characteristics of users (e.g., stored speech characteristics associated with user profile identifiers associated with the device 110 that determined the audio data 211). The user recognition component 295 may additionally or alternatively perform user recognition by comparing biometric data (e.g., fingerprint data, iris data, retina data, etc.), received by the system 120 in correlation with a natural language input, to stored biometric data of users (e.g., stored biometric data associated with user profile identifiers associated with the device 110 that determined the audio data 211 or otherwise captured a user input). The user recognition component 295 may additionally or alternatively perform user recognition by comparing image data (e.g., including a representation of at least a feature of a user), received by the system 120 in correlation with a natural language input, with stored image data including representations of features of different users (e.g., stored image data associated with user profile identifiers associated with the device 110 that determined the audio data 211 or otherwise captured a user input). The user recognition component 295 may perform other or additional user recognition processes, including those known in the art. For a particular user input, the user recognition component 295 may perform processing with respect to stored data of users associated with the device 110 that captured the user input.

The user recognition component 295 determines whether a user input originated from a particular user. For example, the user recognition component 295 may determine a first value representing a likelihood that a user input originated from a first user, a second value representing a likelihood that user input originated from a second user, etc. The user recognition component 295 may also determine an overall confidence regarding the accuracy of user recognition processing.

The user recognition component 295 may output a single user profile identifier corresponding to the most likely user that originated the user input. Alternatively, the user recognition component 295 may output multiple user profile identifiers (e.g., in the form of an N-best list) with respective values representing likelihoods of respective users originating the user input. The output of the user recognition component 295 may be used to inform NLU processing, processing performed by a skill, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 270 may include one or more user profiles. Each user profile may be associated with a different user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language inputs. If a user does not enable a skill, the system 120 may not invoke the skill to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith.

Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

Figure 6:
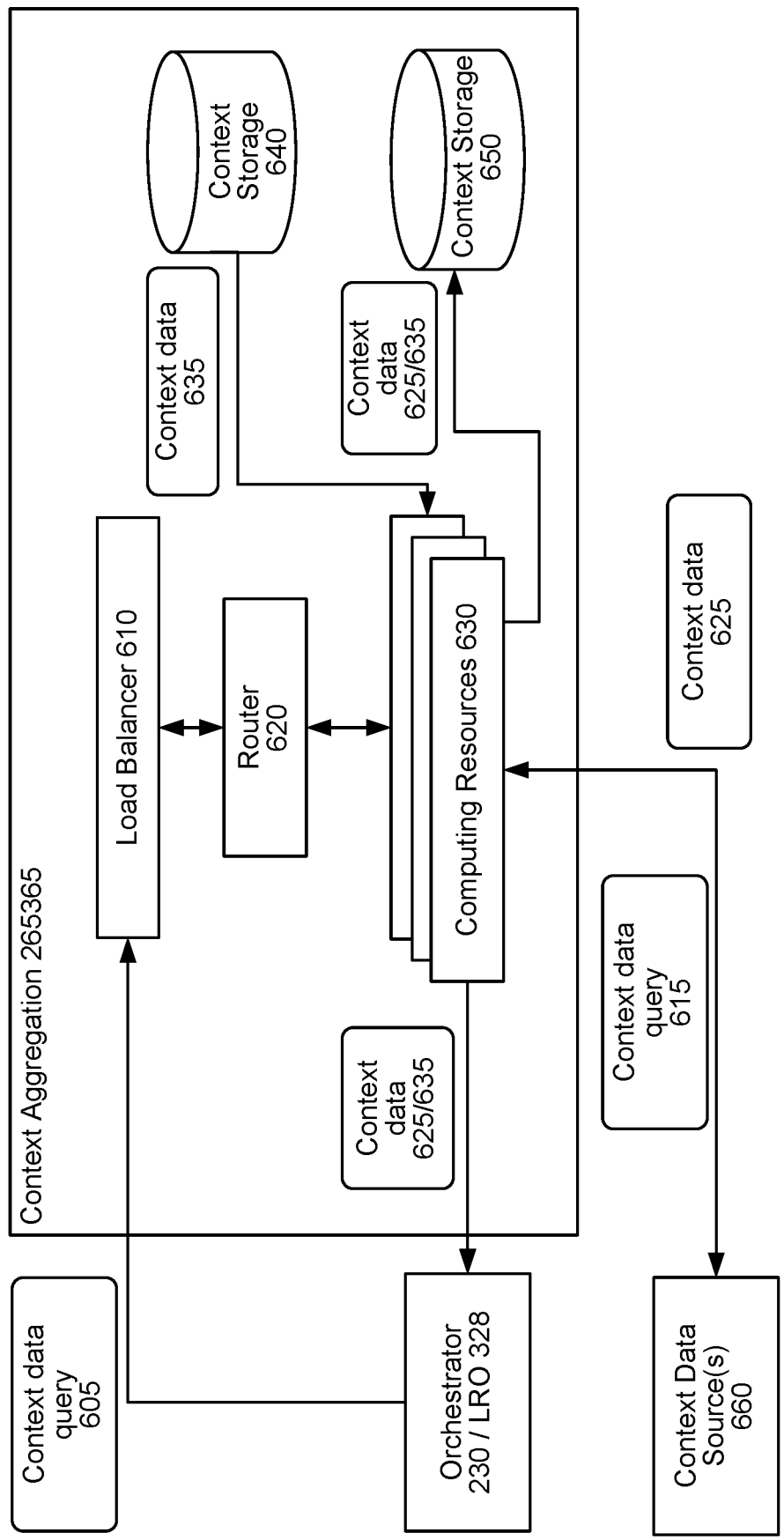
FIG. 6 is a conceptual diagram illustrating components for aggregating context data in response to a query for context data, according to embodiments of the present disclosure.

The system 120 may include a context aggregation component 265 configured to process as described in detail with respect to FIG. 6.

Figure 3:
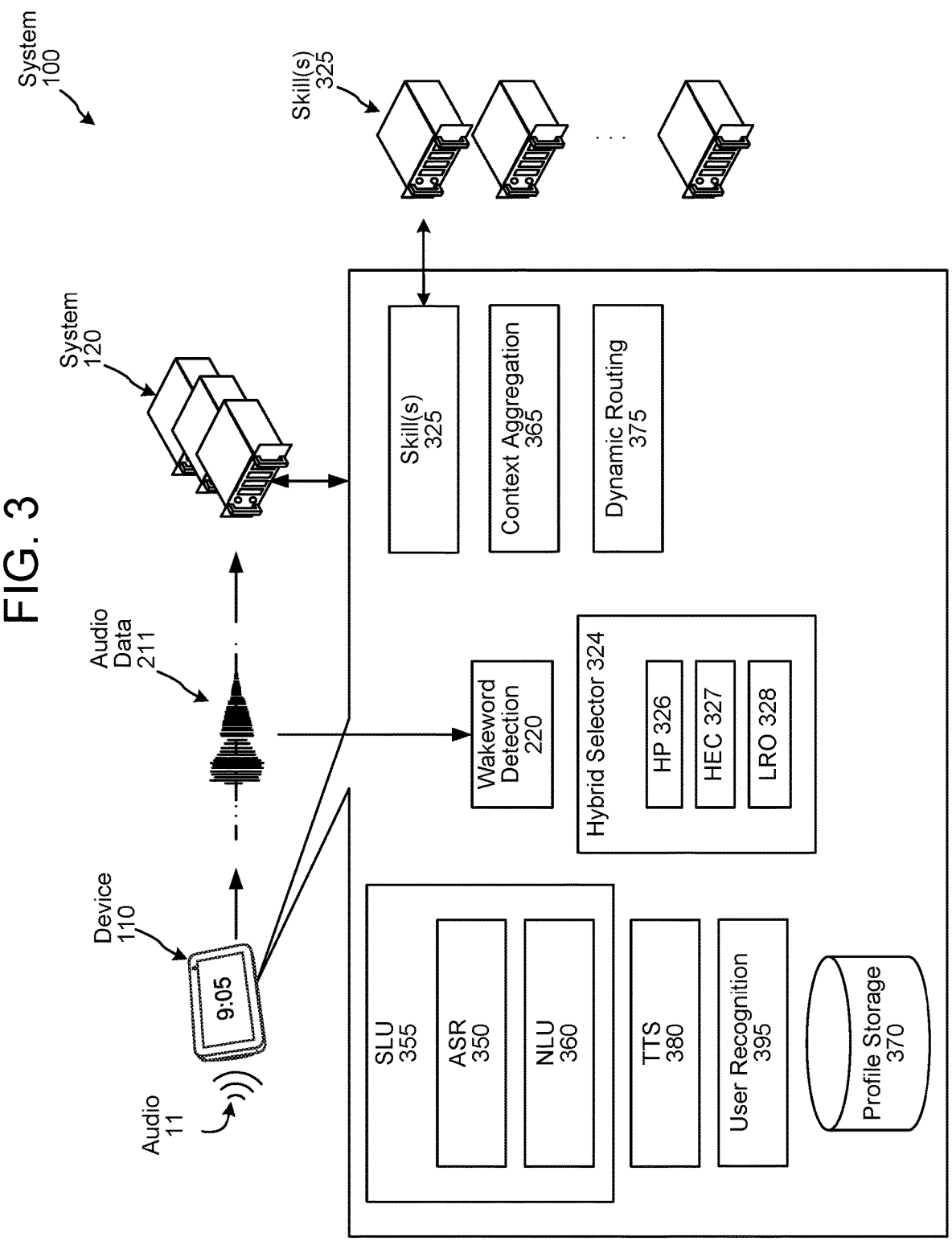
FIG. 3 is a conceptual diagram of components of a device, according to embodiments of the present disclosure.

The foregoing describes illustrative components and processing of the system 120. The following describes illustrative components and process of the device 110. As illustrated in FIG. 3, in at least some embodiments, the system 120 may receive the audio data 211 from the device 110, to recognize speech corresponding to a spoken input in the received audio data 211, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2, the device 110 may include a wakeword detection component 220 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the system 120 and/or an on-device ASR component 350. The wakeword detection component 220 may also send an indication, to the hybrid selector 324, representing a wakeword was not detected. In response to receiving such an indication, the hybrid selector 324 may refrain from sending the audio data 211 to the system 120, and may prevent the ASR component 350 from further processing the audio data 211. In this situation, the audio data 211 can be discarded.

The device 110 may conduct its own speech processing using on-device language processing components, such as an SLU component 355 (the ASR component 350 and an NLU 360), similar to the manner discussed above with respect to the SLU component 255 (or ASR component 250 and the NLU component 260) of the system 120. The device 110 may also internally include, or otherwise have access to, other components such as one or more skill components 325 capable of executing commands based on NLU output data or other results determined by the device 110/system 120, a user recognition component 395 (configured to process in a similar manner to that discussed above with respect to the user recognition component 295 of the system 120), profile storage 370 (configured to store similar profile data to that discussed above with respect to the profile storage 270 of the system 120), a context aggregation component 365, a dynamic routing component 375, and other components. In at least some embodiments, the profile storage 370 may only store profile data for a user or group of users specifically associated with the device 110.

In at least some embodiments, the on-device language processing components may not have the same capabilities as the language processing components of the system 120. For example, the on-device language processing components may be configured to handle only a subset of the natural language inputs that may be handled by the system 120. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the language processing results determined by the device 110 may indicate a low confidence or other metric indicating that the processing by the device 110 may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the ASR component 350 about the availability of new audio data 211 that represents user speech, and to otherwise initiate the operations of on-device language processing when new audio data 211 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 326 may allow the audio data 211 to pass through to the system 120 and the HP 326 may also input the audio data 211 to the on-device ASR component 350 by routing the audio data 211 through the HEC 327 of the hybrid selector 324, whereby the LRO 328 notifies the ASR component 350 of the audio data 211. At this point, the hybrid selector 324 may wait for response data from either or both of the system 120 or the on-device language processing components. However, the disclosure is not limited thereto, and in some examples the hybrid selector 324 may send the audio data 211 only to the on-device ASR component 350 without departing from the disclosure. For example, the device 110 may process the audio data 211 on-device without sending the audio data 211 to the system 120.

The on-device ASR component 350 is configured to receive the audio data 211 from the hybrid selector 324, and to recognize speech in the audio data 211, and the on-device NLU component 360 is configured to determine a user intent from the recognized speech, and to determine how to act on the user intent by generating NLU output data which may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic API call with a same logical operation as a remotely-determined directive. In other words, a device-determined directive may mimic a remotely-determined directive by using a same, or a similar, format as the remotely-determined directive.

A NLU hypothesis (output by the NLU component 360) may be selected as usable to respond to a natural language input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language input. The device 110 may include the unique identifier when sending the audio data 211 to the system 120, and the response data from the system 120 may include the unique identifier to identify which natural language input the response data corresponds.

In at least some embodiments, the device 110 may include, or be configured to use, one or more skill components 325 that may work similarly to the skill component(s) 225. The skill component(s) 325 may correspond to one or more domains that are used in order to determine how to act on a spoken input in a particular way, such as by outputting a directive that corresponds to the determined intent, and which can be processed to implement the desired operation. The skill component(s) 325 installed on (or in communication with) the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Figure 4:
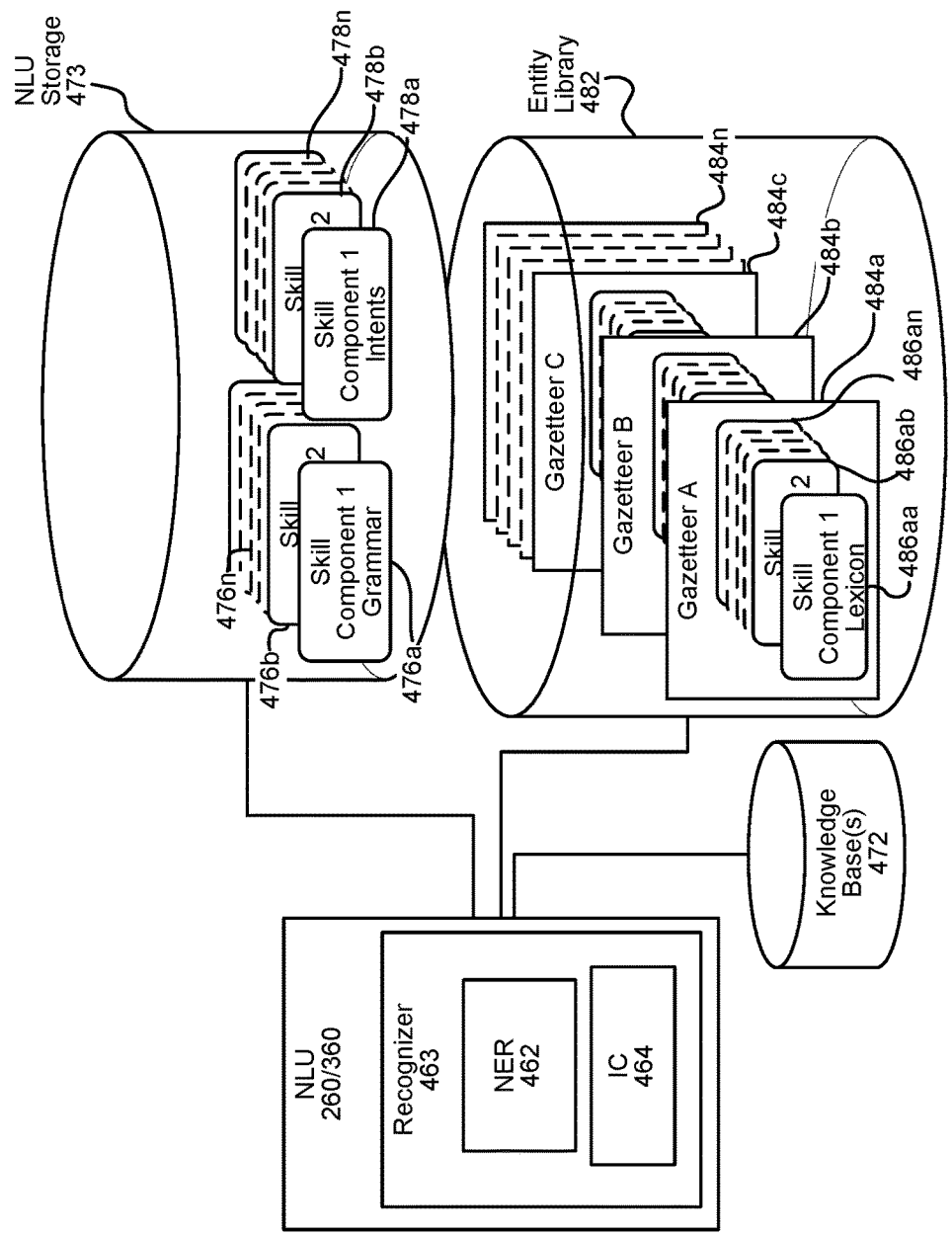
FIG. 4 is a conceptual diagram of how natural language processing may be performed, according to embodiments of the present disclosure.

Referring now to FIG. 4, it is described how NLU processing may be performed. The NLU component 260/360 may include one or more recognizers 463. In at least some embodiments, a recognizer 463 may be associated with a skill component 225/325 (e.g., the recognizer may be configured to interpret a natural language input to correspond to the skill component 225/325). In at least some other examples, a recognizer 463 may be associated with a domain (e.g., the recognizer may be configured to interpret a natural language input to correspond to the domain). A non-limiting list of domains includes a smart home domain, a music domain, a video domain, a flash briefing domain, a shopping domain, a communications domain, and/or a custom domain.

Recognizers 463 may process in parallel, in series, partially in parallel, etc. For example, a recognizer corresponding to a first domain may process at least partially in parallel to a recognizer corresponding to a second domain. For further example, a recognizer corresponding to a first skill component may process at least partially in parallel to a recognizer corresponding to a second skill component. In another example, a recognizer corresponding to a domain may process at least partially in parallel to a recognizer corresponding to a skill component.

The NLU component 260/360 may communicate with various storages. The NLU component 260/360 may communicate with an NLU storage 473, which includes skill component grammars (476a-476n), representing how natural language inputs may be formulated to invoke skill components 225/325, and skill component intents (478a-478n) representing intents supported by respective skill components 225/325.

Each recognizer 463 may be associated with a particular grammar 476, one or more particular intents 478, and a particular personalized lexicon 486 (stored in an entity library 482). A gazetteer 484 may include skill component-indexed lexical information associated with a particular user. For example, Gazetteer A (484a) may include skill component-indexed lexical information 486aa to 486an. A user's music skill component lexical information might include album titles, artist names, and song names, for example, whereas a user's contact list skill component lexical information might include the names of contacts. Since every user's music collection and contact list is presumably different, this personalized information may improve entity resolution.

Each recognizer 463 may include a named entity recognition (NER) component 462 that attempts to identify grammars and lexical information that may be used to construe meaning with respect to text data input therein. A NER component 462 identifies portions of text data that correspond to a named entity that may be recognizable by the system 120/device 110. A NER component 462 may also determine whether a word refers to an entity that is not explicitly mentioned in the text, for example "him," "her," "it" or other anaphora, exophora or the like.

A NER component 462 applies grammar models 476 and lexical information 486 associated with one or more skill components 225/325 to determine a mention of one or more entities in text data input therein. In this manner, a NER component 462 identifies "slots" (i.e., particular words in text data) that may be needed for later processing. A NER component 462 may also label each slot with a type (e.g., noun, place, city, artist name, song name, etc.).

Each grammar model 476 may include the names of entities (i.e., nouns) commonly found in natural language about a particular skill component 225/325 to which the grammar model 476 relates, whereas lexical information 486 may be personalized to the user identifier output by a user recognition component 295/395 for the natural language input. For example, a grammar model 476 associated with a shopping skill component may include a database of words commonly used when people discuss shopping.

A downstream process called named entity resolution actually links a portion of text data (identified by a NER component 462) to a specific entity known to the system 120/device 100. To perform named entity resolution, the NLU component 260/360 may use gazetteer information (484a-484n) stored in the entity library storage 482. The gazetteer information 484 may be used to match text data (identified by a NER component 462) with different entities, such as song titles, contact names, etc. Gazetteers may be linked to users (e.g., a particular gazetteer may be associated with a specific user's music collection), may be linked to certain skill components 225/325 (e.g., a shopping skill component, a music skill component, a video skill component, a communications skill component, etc.), or may be organized in another manner.

Each recognizer 463 may also include an intent classification (IC) component 464 that processes text data input thereto to determine an intent(s) of a skill component(s) 225/325 that potentially corresponds to the natural language input represented in the text data. An intent corresponds to an action to be performed that is responsive to the natural language input represented by the text data. An IC component 464 may communicate with a database 478 of words linked to intents. For example, a music intent database may link words and phrases such as "quiet," "volume off," and "mute" to a <Mute> intent. An IC component 464 identifies potential intents by comparing words and phrases in text data to the words and phrases in an intents database 478 associated with the skill component(s) 225/325 that is associated with the recognizer 463 implementing the IC component 464.

The intents identifiable by a specific IC component 464 may be linked to one or more skill component-specific grammar frameworks 476 with "slots" to be filled. Each slot of a grammar framework 676 corresponds to a portion of text data that a NER component 462 believes corresponds to an entity. For example, a grammar framework 476 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 476 may not be structured as sentences, but rather based on associating slots with grammatical tags.

For example, a NER component 462 may identify words in text data as subject, object, verb, preposition, etc. based on grammar rules and/or models prior to recognizing named entities in the text data. An IC component 464 (implemented by the same recognizer 463) may use the identified verb to identify an intent. The NER component 462 may then determine a grammar model 476 associated with the identified intent. For example, a grammar model 676 for an intent corresponding to <PlayMusic> may specify a list of slots applicable to play the identified "object" and any object modifier (e.g., a prepositional phrase), such as {Artist Name}, {Album Name}, {Song name}, etc. The NER component 462 may then search corresponding fields in a lexicon 486, attempting to match words and phrases in the text data the NER component 462 previously tagged as a grammatical object or object modifier with those identified in the lexicon 486.

A NER component 462 may perform semantic tagging, which is the labeling of a word or combination of words according to their type/semantic meaning. A NER component 462 may parse text data using heuristic grammar rules, or a model may be constructed using techniques such as hidden Markov models, maximum entropy models, log linear models, conditional random fields (CRF), and the like. For example, a NER component 462, implemented by a music skill component or music domain recognizer 463, may parse and tag text data corresponding to "play mother's little helper by the rolling stones" as {Verb}: "Play," {Object}: "mother's little helper," {Object Preposition}: "by," and {Object Modifier}: "the rolling stones." The NER component 462 may identify "Play" as a verb based on a word database associated with the music skill component or music domain, which an IC component 464 may determine corresponds to a <PlayMusic> intent. At this stage, no determination has been made as to the meaning of "mother's little helper" and "the rolling stones," but based on grammar rules and models, the NER component 462 has determined that the text of these phrases relates to the grammatical object (i.e., entity).

The frameworks linked to the intent are then used to determine what database fields should be searched to determine the meaning of these phrases, such as searching a user's gazetteer 484 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 484 does not resolve a slot/field using gazetteer information, the NER component 462 may search a database of generic words (in the knowledge base 472). For example, if the text data corresponds to "play songs by the rolling stones," after failing to determine an album name or song name called "songs" by "the rolling stones," the NER component 462 may search a music skill component vocabulary for the word "songs." In the alternative, generic words may be checked before the gazetteer information, or both may be tried, potentially producing two different results.

A recognizer 463 may tag text data to attribute meaning thereto. For example, a recognizer 463 may tag "play mother's little helper by the rolling stones" as: {skill component} Music, {intent} Play Music, {artist name} rolling stones, {media type} SONG, and {song title} mother's little helper. For further example, a recognizer 463 may tag "play songs by the rolling stones" as: {skill component} Music, {intent} Play Music, {artist name} rolling stones, and {media type} SONG.

As described above, more than one recognizer 463 may process with respect to text data representing a single natural language input. In such instances, each recognizer 463 may output at least one NLU hypothesis including an intent indicator (determined by an IC component 464 of the recognizer 463) and at least one tagged named entity (determined by a NER component 462 of the recognizer 463).

The NLU component 260/360 may include a shortlister component 510. The shortlister component 510 selects skill components 225/325 that may execute in response to the natural language input. The shortlister component 510 thus limits downstream, more resource intensive NLU processes to being performed with respect to skill components 225/325 that are likely to execute in response to the natural language input.

Without a shortlister component 510, the NLU component 260/360 may process a given ASR hypothesis (or the text data 213 depending on the type of natural language input being processed) with respect to every skill component 225/325 of (or in communication with) the system 120, either in parallel, in series, or using some combination thereof. By implementing a shortlister component 510, the NLU component 260/360 may process a given ASR hypothesis (or the text data 213) with respect to only the skill components 225/325 that are likely to execute in response to the natural language input. This reduces total compute power and latency attributed to NLU processing.

The shortlister component 510 may include one or more ML models. The ML model(s) may be trained to recognize various forms of natural language inputs that may be received by the system 120/device 110. For example, during a training period a skill component 225/325 may provide the system 120/device 110 with training data representing sample natural language inputs that may be provided by a user to invoke the skill component 225/325. For example, a ride sharing skill component may provide the system 120/device 110 with training data including text corresponding to "get me a cab to [location]," "get me a ride to [location]," "book me a cab to [location]," "book me a ride to [location]," etc. The one or more ML models may be trained using the training data to determine other potentially related natural language input structures that a user may try to use to invoke the particular skill component 225/325. During training, the system 120/device 110 may query the skill component 225/325 regarding whether the determined other natural language input structures are permissible, from the perspective of the skill component 225/325, to be used to invoke the skill component 225/325 at runtime. The alternate natural language input structures may be derived by one or more ML models during model training and/or may be based on natural language input structures provided by different skill components 225/325. The skill component 225/325 may also provide the system 120/device 110 with training data indicating grammar and annotations. The system 120/device 110 may use the training data representing the sample natural language inputs, the determined related natural language input(s), the grammar, and the annotations to train a ML model that indicates when a runtime natural language input is likely to be directed to/handled by a particular skill component 225/325. Each ML model of the shortlister component 510 may be trained with respect to a different skill component 225/325. Alternatively, the shortlister component 510 may implement one ML model per skill component type, such as one ML model for weather skill components, one ML model for ride sharing skill components, etc.

The system 120/device 110 may use the sample natural language inputs provided by a skill component 225/325, and related sample natural language inputs determined during training, as binary examples to train a ML model associated with the skill component 225/325. The ML model associated with the particular skill component 225/325 may then be operated at runtime by the shortlister component 510. Some sample natural language inputs may be positive training examples (e.g., natural language inputs that may be used to invoke the skill component 225/325), whereas other sample natural language inputs may be negative training examples (e.g., natural language inputs that may not be used to invoke the skill component 225/325).

As described above, the shortlister component 510 may include a different ML model for each skill component 225/325, a different ML model for each skill component type, or some other combination of ML models. For example, the shortlister component 510 may alternatively include a single ML model. The single ML model may include a portion trained with respect to characteristics (e.g., semantic characteristics) shared by all skill components 225/325. The single ML model may also include skill component-specific portions, with each skill component-specific portion being trained with respect to a different skill component 225/325. Implementing a single ML model with skill component-specific portions may result in less latency than implementing a different ML model for each skill component 225/325 because the single ML model with skill component-specific portions limits the number of characteristics processed on a per skill component level.

The portion of the ML model, trained with respect to characteristics shared by more than one skill component 225/325, may be clustered based on skill component type. For example, a first portion, of the portion trained with respect to multiple skill components 225/325, may be trained with respect to weather skill components; a second portion, of the portion trained with respect to multiple skill components 225/325, may be trained with respect to music skill components; a third portion, of the portion trained with respect to multiple skill components 225/325, may be trained with respect to travel skill components; etc.

Clustering may not be beneficial in every instance because clustering may cause the shortlister component 510 to output indications of only a portion of the skill components 225/325 that the natural language input may relate to. For example, a natural language input may correspond to "tell me about Tom Collins." If the ML model is clustered based on skill component type, the shortlister component 510 may determine the natural language input corresponds to a recipe skill component (e.g., storing or otherwise having access to a drink recipe) even though the natural language input may also correspond to an information skill component (e.g., storing or otherwise having access to information about a person named Tom Collins).

Training the ML model(s) of the shortlister component 510 may require establishing a "ground truth" for the training examples input therein. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The ML model(s) of the shortlister component 510 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

If the shortlister component 510 determines a natural language input is associated with multiple skill components 225/325, only the recognizers 463 associated with those skill components 225/325 may process with respect to the natural language input. The selected recognizers 463 may process in parallel, in series, partially in parallel, etc. For example, if the shortlister component 510 determines a natural language input may relate to both a communications skill component and a music skill component, a recognizer 463 associated with the communications skill component may process in parallel, or partially in parallel, with a recognizer 463 associated with the music skill component processing.

The shortlister component 510 may make binary determinations (e.g., yes or no) regarding which skill component(s) 225/325 corresponds to a natural language input. The shortlister component 510 may make such determinations using the one or more ML models described herein above. If the shortlister component 510 implements a single ML model for each skill component 225/325, the shortlister component 510 may simply run the ML models that are associated with enabled skill components 225/325 as indicated in a profile (e.g., stored in the profile storage 270/370) associated with the device 110 and/or user 5 that originated the natural language input.

The shortlister component 510 may generate shortlisted skill component data 515 representing one or more skill components 225/325 that may execute in response to the natural language input. The number of skill components 225/325 represented in the shortlisted skill component data 515 is configurable. In an example, the shortlisted skill component data 515 may indicate every skill component 225/325 of (or otherwise in communication with) the system 120/device 110 as well as contain an indication, for each skill component 225/325, representing whether the skill component 225/325 is likely capable of processing in response to the natural language input. In another example, instead of indicating every skill component 225/325, the shortlisted skill component data 515 may only indicate the skill components 225/325 that are likely capable of processing in response to the natural language input. In yet another example, the shortlister component 510 may implement thresholding such that the shortlisted skill component data 515 may indicate no more than a maximum number of skill components 225/325 that may process in response to the natural language input.

In at least some embodiments, the shortlister component 510 may generate a score representing how likely a skill component 225/325 is likely to process in response to a natural language input. In such embodiments, the shortlisted skill component data 515 may only include identifiers of skill components 225/325 associated with scores meeting or exceeding a threshold score.

In the situation where the ASR component 250/350 outputs ASR output data including more than one interpretation of a natural language input, the shortlister component 510 may output different shortlisted skill component data 515 for each interpretation. Alternatively, the shortlister component 510 may output a single shortlisted skill component data 515 representing the skill components 225/325 corresponding to the different interpretations.

As indicated above, the shortlister component 510 may implement thresholding such that the shortlisted skill component data 515 may indicate no more than a threshold number of skill components 225/325 (e.g., may include no more than a threshold number of skill component identifiers). If the ASR component 250/350 outputs ASR output data including more than one interpretation of a natural language input, the shortlisted skill component data 515 may indicate no more than a threshold number of skill components 225/325 irrespective of the number of interpretations output by the ASR component 250/350. Alternatively or in addition, the shortlisted skill component data 515 may indicate no more than a threshold number of skill components 225/325 for each interpretation (e.g., indicating no more than five skill components 225/325 for a first interpretation, no more than five skill components 225/325 for a second interpretation, etc.).

In addition to making a binary determination regarding whether a skill component 225/325 may process in response to a natural language input, the shortlister component 510 may generate scores representing likelihoods that skill components 225/325 may process in response to the natural language input. If the shortlister component 510 implements a different ML model for each skill component 225/325, the shortlister component 510 may generate a different confidence score for each skill component-specific ML model that is run by the shortlister component 510. For example, if the shortlister component 510 runs the ML models of every skill component 225/325 of (or otherwise in communication with) the system 120/device 110, the shortlister component 510 may generate a respective confidence score for each skill component 225/325. For further example, if the shortlister component 510 only runs ML models specific to skill components 225/325 that are indicated as enabled in a profile associated with the device 110 and/or user 5 (as stored in the profile storage 270/370), the shortlister component 510 may only generate a respective confidence score for each enabled skill component 225/325. For further example, if the shortlister component 510 implements a single ML model with skill component-specific portions, the shortlister component 510 generate a respective confidence score for each skill component 225/325 who's specifically trained portion is run. The shortlister component 510 may perform matrix vector modification to obtain confidence scores for skill components 225/325.

An example of shortlisted skill component data 515 including confidence scores may be represented as:
  Search skill component, 0.67
  Recipe skill component, 0.62
  Information skill component, 0.57
As indicated, the confidence scores output by the shortlister component 510 may be numeric values. The confidence scores output by the shortlister component 510 may alternatively be binned values (e.g., high, medium, low).

The shortlister component 510 may consider other data 520 when determining which skill components 225/325 may process in response to a natural language input. The other data 520 may be character embedded prior to being input to the shortlister component 510. The other data 520 may alternatively be embedded using other techniques.

The other data 520 may include usage history data associated with the device 110 and/or user 5. For example, a confidence score of a skill component 225/325 may be increased if natural language inputs captured by the device 110 and/or originating from the user 5 routinely relate to the skill component 225/325. Conversely, a confidence score of a skill component 225/325 may be decreased if natural language inputs captured by the device 110 and/or originated from the user 5 rarely relate to the skill component 225/325.

The other data 520 may indicate the skill components 225/325 that are enabled with respect to the device 110 and/or user 5 (e.g., as represented in the profile storage 270/370). The shortlister component 510 may use such data to determine which skill component-specific ML models to run. That is, the shortlister component 510 may determine to only run the ML models associated with enabled skill components 225/325. The shortlister component 510 may alternatively use such data to alter skill component confidence scores represented in the shortlisted skill component data 515. As an example, considering two skill components 225/325, one enabled and another unenabled, the shortlister component 510 may run a first ML model (or ML model portion) specific to the unenabled skill component as well as a second ML model (or ML model portion) specific to the enabled skill component. The shortlister component 510 may initially determine a confidence score of 0.60 for each of the unenabled skill component and the enabled skill component. The shortlister component 510 may then alter those confidence scores based on which skill component is enabled. For example, the shortlister component 510 may increase the confidence score associated with the enabled skill component and/or decrease the confidence score associated with the unenabled skill component.

A user 5 may provide the system 120 with indications of which skill components 225/325 are enabled (e.g., authorized to execute using data associated with the user 5). Such indications may be stored in the profile storage 270/370. The shortlister component 510 may determine whether profile data associated with the user 5 and/or device 110 that originated the natural language input includes indications of enabled skill components 225/325.

The other data 520 may indicate a type of the device 110. The type of the device 110 may indicate the input/output capabilities of the device 110. For example, the device 110 may include a display, may be headless (e.g., displayless), may be mobile or stationary, may include audio playback capabilities, may include a camera, etc. The shortlister component 510 may use such other data 520 to determine which skill component-specific ML models (or ML model portions) to run. For example, if the device 110 is displayless, the shortlister component 510 may determine not to run ML models (or ML model portions) specific to skill components 225/325 that output video data. The shortlister component 510 may alternatively use such other data 520 to alter skill component confidence scores represented in the shortlisted skill component data 515. As an example, considering two skill components 225/325, one that outputs audio data and another that outputs video data, the shortlister component 510 may run a first ML model (or portion of a ML model) specific to the skill component that generates audio data as well as a second ML model (or portion of a ML model) specific to the skill component that generates video data. The shortlister component 510 may initially determine a confidence score of 0.60 for each of the skill components. The shortlister component 510 may then alter the original confidence scores based on the type of the device 110. For example, if the device 110 is displayless, the shortlister component 510 may increase the confidence score associated with the skill component that generates audio data and/or decrease the confidence score associated with the skill component that generates video data.

The type of device data represented in the other data 520 may represent output capabilities of the device 110 to be used to output content to the user 5, which may not necessarily be the device 110 that captured the natural language input. For example, a displayless device 110 may receive a natural language input corresponding to "play Game of Thrones". The system 120/device 110 may determine a smart TV, or other device including or otherwise associated with a display, is to be used to output multimedia content (e.g., audio and video) corresponding to the title "Game of Thrones".

The other data 520 may include data indicating a speed of the device 110, a location of the device 110, or other mobility data. For example, the device 110 may correspond to a vehicle including a display. If the vehicle is moving, the shortlister component 510 may decrease the confidence score associated with a skill component 225/325 that generates video data as it may be undesirable to output video content to the user 5 while in a moving vehicle. The vehicle may output data to the system 120 indicating when the vehicle is in motion.

The other data 520 may include data indicating a currently invoked skill component 225/325 (e.g., a skill component 225/325 that was processing to output content to the user 5 when the device 110 received the natural language input). For example, the user 5 may speak a first (e.g., a previous) natural language input causing the system 120 to invoke a music skill component to output music to the user 5. As the music is being output to the user 5, the system 120 may receive a second (e.g., a current) natural language input. The shortlister component 510 may use such other data 520 to alter skill component confidence scores represented in the shortlisted skill component data 515. For example, the shortlister component 510 may run a first ML model (or ML model portion) specific to a first skill component as well as a second ML model (or ML model portion) specific to a second skill component. The shortlister component 510 may initially determine a confidence score of 0.60 for each of the first and second skill components. The shortlister component 510 may then alter the original confidence scores based on the first skill component being invoked to output content while the current natural language input was received. Based on the first skill component being invoked, the shortlister component 510 may increase the confidence score associated with the first skill component and/or decrease the confidence score associated with the second skill component.

The thresholding implemented with respect to the shortlisted skill component data 515 and the different types of other data 520 considered by the shortlister component 510 are configurable. For example, the shortlister component 510 may update confidence scores as more other data 520 is considered.

The shortlister component 510 may cause the NLU component 260/360 to invoke only a subset of the recognizers 463 associated with skill components 225/325 represented in the shortlisted skill component 515 as being likely to process in response to the natural language input. If the shortlister component 510 generates the shortlisted skill component data 515 to include confidence scores, the shortlister component 510 may cause the NLU component 260/360 to invoke only recognizers 463 associated with skill components 225/325 associated with confidence scores satisfying (e.g., meeting or exceeding) a condition (e.g., a threshold confidence score).

Figure 5:
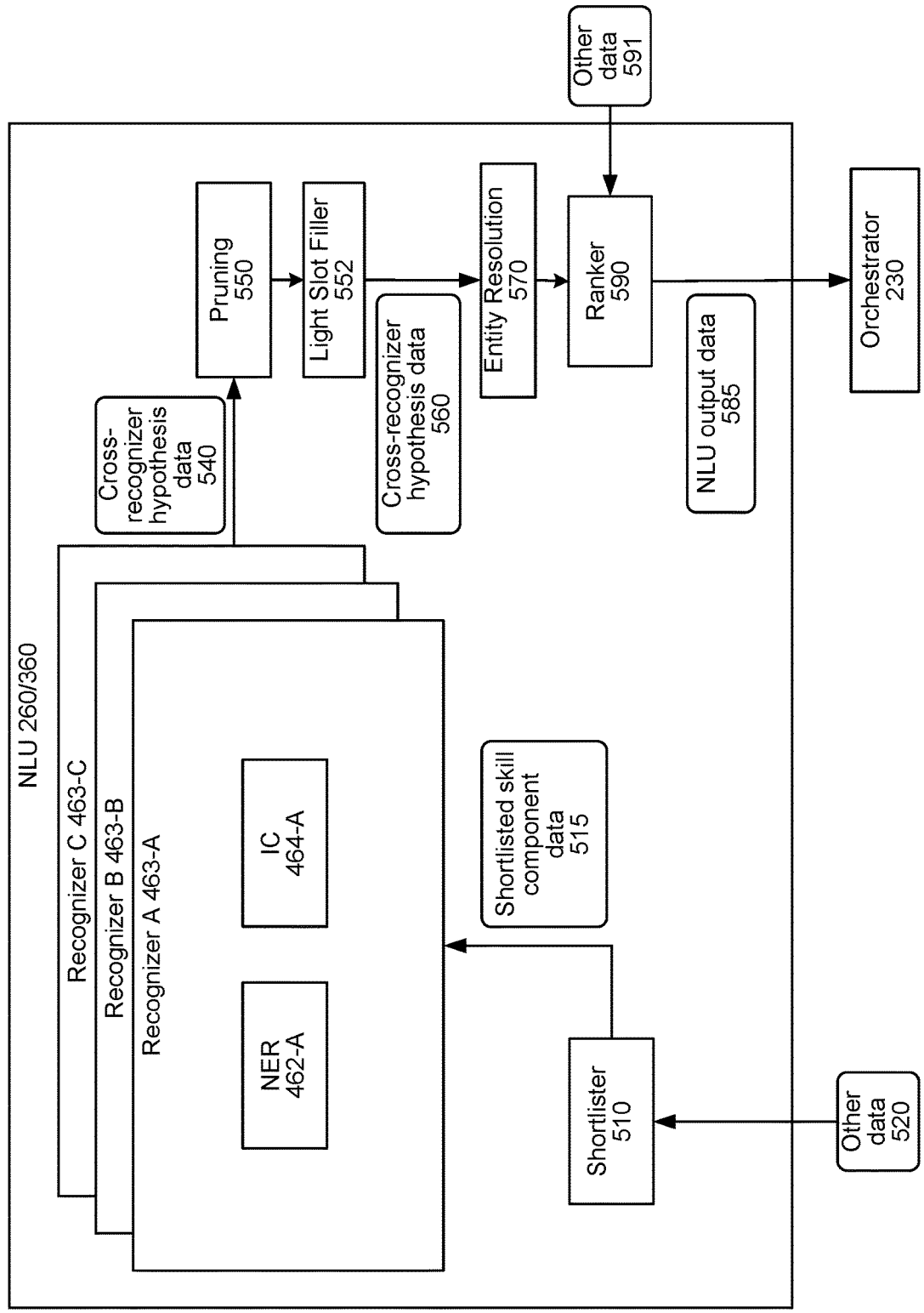
FIG. 5 is a conceptual diagram of how natural language processing may be performed, according to embodiments of the present disclosure.

The NLU component 260/360 may compile NLU hypotheses, output by multiple recognizers 463, into cross-recognizer hypothesis data 540 (illustrated in FIG. 5). Each NLU hypothesis may be associated with a respective score indicating a likelihood that the NLU hypothesis corresponds to the domain, one or more skill components 225/325, etc. associated with the recognizer 463 from which the NLU hypothesis was output. For example, the cross-recognizer hypothesis data 540 may be represented as, with each line corresponding to a different NLU hypothesis:

[0.95] Intent: <PlayMusic> AlbumName: GameOfThrones

[0.70] Intent: <Play Video> VideoTitle: GameOfThrones.

While the foregoing illustrates cross-recognizer hypothesis data 540 include two NLU hypotheses, it will be appreciated that the cross-recognizer hypothesis data 540 may include differing numbers of NLU hypotheses with departing from the present disclosure.

The NLU component 260/360 may send the cross-recognizer hypothesis data 540 to a pruning component 550, which sorts the NLU hypotheses, represented in the cross-recognizer hypothesis data 540, according to their respective scores. The pruning component 550 may then perform score thresholding with respect to the cross-recognizer hypothesis data 540. For example, the pruning component 550 may select NLU hypotheses, represented in the cross-recognizer hypothesis data 540, associated with scores satisfying (e.g., meeting and/or exceeding) a condition (e.g., a threshold score). The pruning component 550 may additionally or alternatively perform number of NLU hypothesis thresholding. For example, the pruning component 550 may select a threshold number of top-scoring NLU hypotheses represented in the cross-recognizer hypothesis data 540.

The pruning component 550 may generate cross-recognizer hypothesis data 560 including the selected NLU hypotheses. The purpose of the pruning component 750 is to create a reduced list of NLU hypotheses so that downstream, more resource intensive, processes may only operate on NLU hypotheses that most likely represent the natural language input.

The NLU component 260/360 may include a light slot filler component 552 that takes text from slots, represented in the NLU hypotheses output by the pruning component 550, and alters it to make the text more easily processed by downstream components. The light slot filler component 552 may perform low latency operations that do not involve heavy operations such as reference to a knowledge base. The purpose of the light slot filler component 552 is to replace words with other words or values that may be more easily understood by downstream components. For example, if a NLU hypothesis includes the word "tomorrow," the light slot filler component 552 may replace the word "tomorrow" with an actual date for purposes of downstream processing. Similarly, the light slot filler component 552 may replace the word "CD" with "album" or "compact disc." The replaced text is then included in the cross-recognizer hypothesis data 560.

The cross-recognizer hypothesis data 560 may be sent to an entity resolution component 570. The entity resolution component 570 can apply rules or other instructions to standardize labels or tokens in the NLU hypotheses represented in the cross-recognizer hypothesis data 560. The precise transformation may depend on the skill component 225/325, domain, etc. to which a NLU hypothesis relates. For example, for a travel skill component-specific NLU hypothesis, the entity resolution component 570 may transform text corresponding to "Boston airport" to the standard "BOS" three-letter code referring to the airport. The entity resolution component 570 can refer to a knowledge base that is used to specifically identify the precise entity referred to in each slot of each NLU hypothesis represented in the cross-recognizer hypothesis data 560.

Specific intent/slot combinations may also be tied to a particular source, which may then be used to resolve the text. Referring to the example natural language input "play songs by the stones," the entity resolution component 570 may reference a personal music catalog, a user profile, or the like (for example stored in the profile storage 270/370). The entity resolution component 570 may output NLU hypotheses, altered from the cross-recognizer hypothesis data 560, that include more detailed information (e.g., entity identifiers) about the specific entities mentioned in the slots and/or more detailed slot data that can eventually be used by a skill component 225/325 to perform an action responsive to the natural language input. The NLU component 260/360 may include multiple entity resolution components 570 that are each specific to one or more different skill components 225/325, domains, etc.

The NLU component 260/360 may include a ranker component 590 that assigns a particular score to each NLU hypothesis output by the entity resolution component 570. The ranker component 590 may alter the score of a particular NLU hypothesis based on whether the NLU hypothesis has unfilled slots. For example, if a first NLU hypothesis includes slots that are all filled/resolved, the ranker component 590 may assign the first NLU hypothesis a higher score than a second NLU hypothesis including at least one slot that is unfilled/unresolved by the entity resolution component 570.

The ranker component 590 may apply re-scoring, biasing, or other techniques. To do so, the ranker component 590 may consider not only the data output by the entity resolution component 570, but may also other data 591. The other data 591 may include a variety of data.

For example, the other data 591 indicate skill component 225/325 rating or popularity. For example, if a skill component 225/325 has a high rating, the ranker component 590 may increase the score of a NLU hypothesis associated with that skill component 225/325, and vice versa.

The other data 591 may indicate skill components 225/325 that have been enabled by the user 5. For example, the ranker component 590 may assign higher scores to NLU hypotheses associated with enabled skill components than NLU hypotheses associated with skill components that have not been enabled by the user 5.

The other data 591 include system usage history (e.g., specific to the user 5), such as if the user 5 regularly invokes a particular skill component 225/325 or does so at particular times of day. The other data 591 may indicate a present date, a present time, location of the device 110, weather data, a type of the device 110, a user identifier of the user 5, context data, as well as other data. For example, the ranker component 590 may consider when any particular skill component 225/325 is currently active with respect to the present user 5 and/or device 110 (e.g., music being output by the skill component 225/325 when the current natural language input is received).

The ranker component 590 may output NLU output data 785 including one or more NLU hypotheses. A NLU hypothesis may represent a semantic meaning of the natural language input (e.g., by including one or more portions semantically tagged by a NER component). The NLU component 260/360 may send the NLU output data 285 to the orchestrator component 230.

The following describes how the context aggregation component 265/365 may aggregate context data from various sources. FIG. 6 illustrates how the context aggregation component 265/365 may process a context data query 605 requesting context data corresponding to a particular natural language input. The context data query 605 may be sent to a load balancer 610. The load balancer 610 may assign the context data query 605 to one or more computing resources 630 based on a present load of the computing resources 630.

The context aggregation component 265/365 may receive multiple context data queries associated with the same natural language input. Moreover, more than one of these context data queries may be received by the context aggregation component 265/365 between a time when one or more computing resources 630 are called to process with respect to one of the context data queries and when the one or more computing resources 630 outputs the requested context data. The context aggregation component 265/365 may include a router 620 that acts as a secondary load balancer to the load balancer 610. That is, the router 620 may determine one or more computing resources 630 are currently processing to aggregate context data associated with the natural language input associated with the context data query 605. If none of the computing resources 630 are currently processing as such, the router 620 may let the assignment, determined by the load balancer 610, stand. Conversely, if the router 620 determines one or more computing resources 630 are currently aggregating the requested context data, the router 620 may reassign the context data query 605 to those one or more computing resources 630. The foregoing decisions of the router 620 may be based on job statuses associated with processes performed by one or more computing resources 630. This prevents the computing resources 630 from duplicating queries to the same context data source(s) 660, for the same context data (e.g., thereby decreasing load on downstream context data sources). Moreover, as a result of such reassignment, the computing resources 630 are able to output context data, in response to multiple context data queries, even if processing for one context data query began prior to receipt of a second context data query requesting the same context data. As a result, context data may be provided to the source of the second context data query faster than if the computing resources 630 separately called one or more context data sources 660 in response to the second context data query.

The computing resources 630 may be associated with a preconfigured data framework of entities and relationships (or may have a plurality of preconfigured data frameworks). The data framework may be generated offline, and used by the computing resources 630 at runtime. For example, a data framework may represent a device 110 is associated with a user 5. The user 5 may be associated with one or more endpoint devices. The user 5 may also be associated with a group that includes various users. A data framework may also include nodes representing substance of the natural language input.

The one or more computing resources 630 (either determined by the load balancer 610 or the router 620) may use an entity or natural language input parameter (represented in the context data query 605) as a starting point to traverse the data framework to determine different types of related entities. For example, if the context data query 605 requests data associated with a particular user identifier, the one or more computing resources 630 may determine one or more endpoint device identifiers associated with the user identifier, a group identifier associated with the user identifier, and/or one or more other user identifiers associated the group identifier.

The one or more computing resources 630 may determine, for each entity, at least one context data source 660. The context data source(s) 660 may have access to various types of context data including, for example, data representing which users of the system 120 are subscribed to one or more pay-for services of the system 120, data representing IP addresses associated with devices from which natural language inputs were received, data representing electronic calendar events, data representing types of music a particular user has listened to over a previous amount of time (e.g., the last 30 days), data representing demographic information of users (e.g., birthdate, gender, education, etc. as represented in user profiles) etc. In general, the context data source(s) 660 may provide context data that may be used by various components of the system 120/device 110 in performing their respective processes. A context data source 660 may be a storage containing context data, or may be a computer processing component in communication with such a storage. A context data source(s) 660 may be implemented by the system 120/device 110, or may be implemented separately from but in communication with the system 120/device 110.

The one or more computing resources 630 may send a context data query 615 to each determined context data source 660. The context data query 615, sent to a particular context data source 660, may represent one or more entity identifiers for each of the one or more entity types determined while traversing the data framework. The identifiers may correspond to one or more device identifiers, one or more user identifiers, one or more natural language input identifiers, etc. The one or more computing resources 630 may receive context data 625 from each queried context data source 660.

The one or more computing resources 630 may also query context storage 640 for context data 635 prefetched with respect to the natural language input, user 5, and/or device 110 (e.g., queried from context data sources 660 once the system determined the user identifier and/or device identifier of the user 5 and/or device 110, respectively, but prior to a component of the system 120/device 110 needing such context data to process). The one or more computing resources 630 may query context storage 640 with respect to the same identifier(s) that the one or more computing resources send to the context data source(s) 660.

The one or more computing resources 630 may store the context data (625/635) in context storage 650. The context data stored in context storage 650 may represent a source (e.g., a context data source 660) from which the context data was received, one or more identifiers of the one or more computing resources 630 used to obtain the context data, a type of the context data, etc.

The one or more computing resources 630 may also send the context data (625/635) to the component(s) of the system 120/device 110 that originated context data queries requesting the context data. In some examples, the one or more computing resources 630 may send the context data (625/635) to the orchestrator component 230/LRO 328, which may route the context data (625/635) to the system 120/device 110 component(s) that requested the context data. The context data (625/635) may be sent to the system 120/device 110 component that originated the context data query 605. The context data (625/635) may also be sent to one or more system 120/device 110 components that sent context data queries (requesting the same or similar context data as the context data query 605) after the context data query 605 was received, but prior to the context data (625/635) being received by the context aggregation component 265/365 (e.g., context data queries reassigned by the router 620).

The aggregation of context data, as described with respect to FIG. 6, may occur more than once with respect to a single natural language input. For example, the context aggregation component 265/365 may receive a first query for context data to be used to perform ASR processing with respect to a natural language input, a second query for context data to be used to perform NLU processing with respect to the natural language input, a third query for context data to be used to select a skill component 225/325 to be invoked with respect to the natural language input, a fourth query for context data to be used by the skill component 225/325 to perform an action responsive to the natural language input, etc. For further example, the context aggregation component 265/365 may receive a first query for context data to be used to perform NLU processing of a natural language input by a first NLU domain, a second query for context data to be used to perform NLU processing of the natural language input by a second NLU domain, etc.

In at least some examples, the context aggregation component 265/365 may associate received context data with a corresponding natural language input identifier for later recall. For example, when the context aggregation component 265/365 prefetches context data to be used for ASR processing, the context aggregation component 265/365 may associate the context data with a corresponding natural language input identifier in storage. Thereafter, if the ASR component 250/350 requests context data for the natural language input identifier, the context aggregation component 265/365 is able to recall the appropriate context data (e.g., the context data associated with the natural language input identifier) from storage. For further example, when the context aggregation component 265/365 prefetches context data to be used for NLU processing, the context aggregation component 265/365 may associate the context data with a corresponding natural language input identifier in storage. Thereafter, if the NLU component 260/360 requests context data for the natural language input identifier, the context aggregation component 265/365 is able to recall the appropriate context data from storage. Other examples are possible.

The context aggregation component 265/365 may receive queries for context data for different natural language inputs and for different stages of natural language input processing. The context aggregation component 265/365 may also receive published events, such as those representing a user has recently enabled a skill component 225/325. The context aggregation component 265/365 may obtain context data when the context aggregation component 265/365 anticipates context data may be used during processing of a natural language input. For example, in response to receiving a published event representing a user has recently enabled a skill component 225/325, the context aggregation component 265/365 may obtain context data that may be used by the skill component 225/325 to process a natural language input provided by the user.

Figure 7:
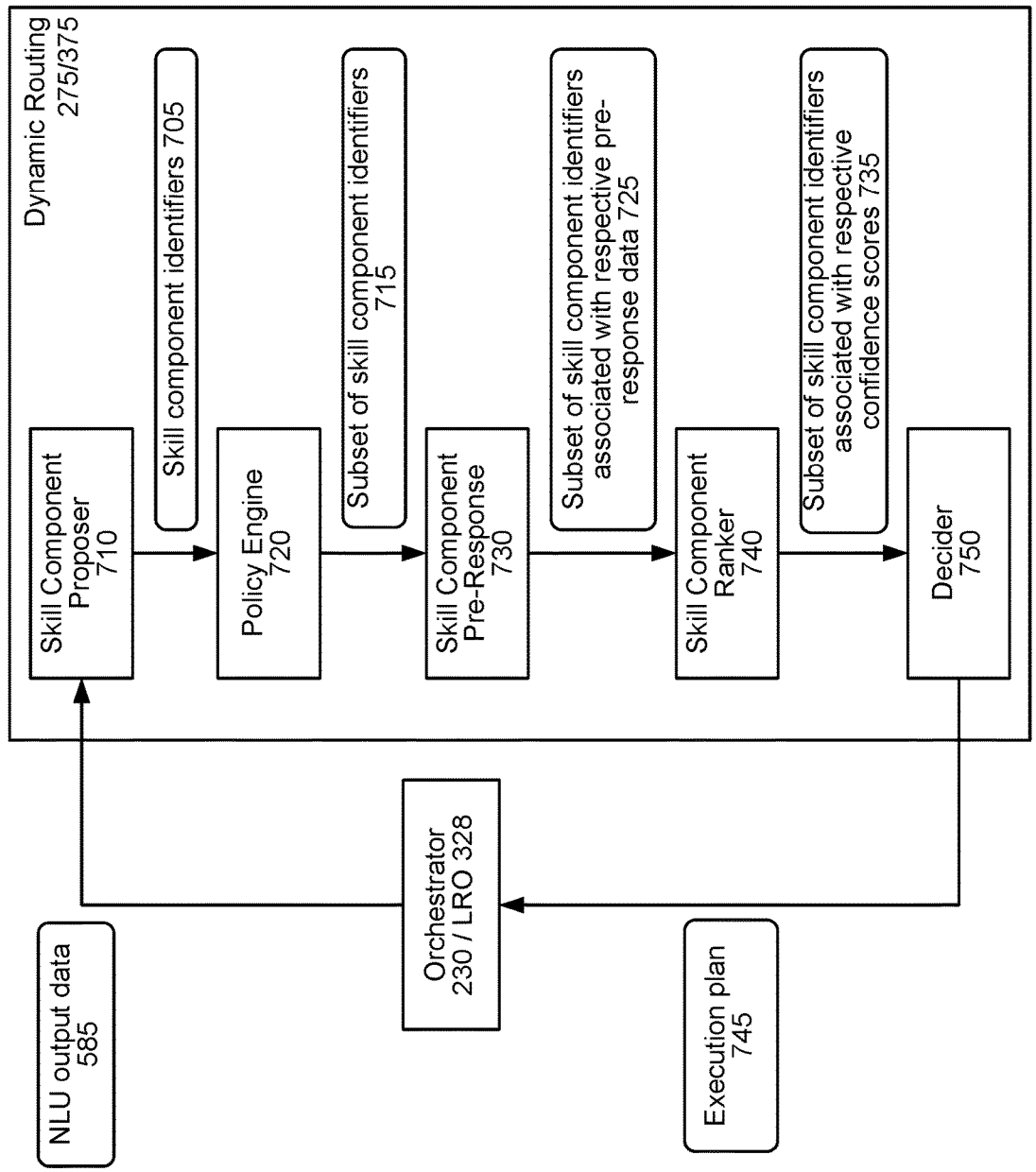
FIG. 7 is a conceptual diagram illustrating how dynamic selection of a skill component may be performed at runtime, according to embodiments of the present disclosure.

The following describes how the dynamic routing component 275/375 may process to select a skill component 225/325 to process in response to a natural language input. As illustrated in FIG. 7, the dynamic routing component 275/375 may include a skill component proposer 710 configured to determine skill components 225/325 capable of processing in response to the natural language input. Example processing of the skill component proposer 710 is described below in reference to FIG. 8.

Figure 8:
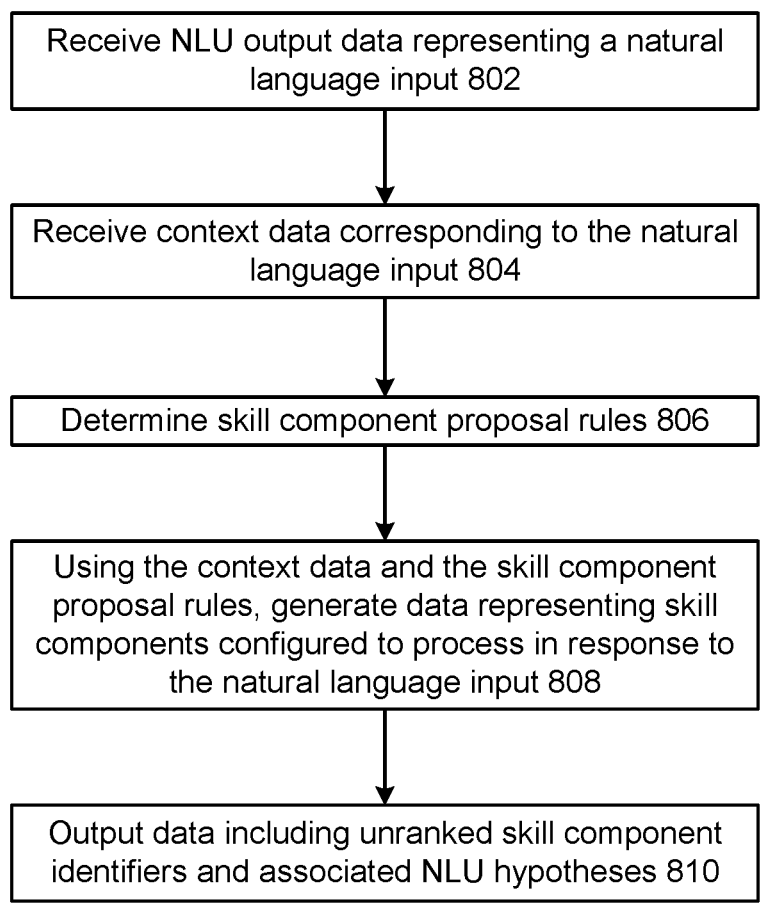
FIG. 8 is process flow diagram illustrating how a skill component proposer may determine skill components capable of processing in response to a natural language input, according to embodiments of the present disclosure.

Referring to FIG. 8, the skill component proposer 710 receives (802) NLU output data 585 representing the natural language input. In at least some embodiments, the skill component proposer 710 may receive the NLU output data 585 from the orchestrator component 230 or LRO 328 (as illustrated in FIG. 7).

The skill component proposer 710 also receives (804) context data corresponding to the natural language input. For example, the context data may indicate (1) a skill component identifier of a skill component 225/325 that was causing the device 110 to output content (e.g., music, video, synthesized speech, etc.) when the device 110 captured the natural language input, (2) one or more skill component identifiers corresponding to one or more skill components 225/325 that are indicated as enabled in a profile (as stored in the profile storage 270/370) associated with the user 5 (as determined by the user recognition component 295/395), (3) output capabilities (which may be represented as a device type identifier) of a device (which may or may not be the same device as the device 110 that captured the natural language input) to be used to output a response to the natural language input, (4) a geographic location of the device 110, (5) data indicating an operation mode of the device to be used to output a response to the natural language input (e.g., data indicating whether the device presently corresponds to a "do not disturb" status, whether the device is enabled to be used for 1-way messaging functionality of the system 120, whether the device is enabled to be used for 2-way communication functionality of the system 120, whether the device is enabled to output announcement content, etc.), (6) ASR output data, (7) various user profile data, and/or other context data available to the system 120/device 110 and corresponding to the natural language input. In at least some embodiments, the skill component proposer 710 may receive the context data in response to the skill component proposer 710 causing a context data query 605 to be sent to the context aggregation component 265/365.

The skill component proposer 710 determines (806) skill component proposal rules. A skill component developer (via a skill component developer device) may provide the rules data, corresponding to one or more rules, representing when the skill component developer's skill component 225/325 should be invoked. In at least some embodiments, such a rule may be specific to an intent. In such embodiments, if a skill component 225/325 is configured to execute with respect to multiple intents, the skill component 225/325 may be associated with more than one rule (e.g., each rule corresponding to a different NLU intent capable of being handled by the skill component 225/325). In addition to being specific to an intent, a rule may indicate one or more entities identifiable by a NER component 462 of the NLU component 260/360), one or more entity identifiers capable of being output by the entity resolution component 570 of the NLU component 260/360), and/or context to which a natural language input may correspond. For example, a rule may indicate context such as output capabilities of a device, a geographic location, an operation mode of a device (e.g., that a device needs to be enabled to be used for 1-way messaging functionality of the system 120, that a device needs to be enabled to be used for 2-way communication functionality of the system 120, that a device needs to be enabled to output announcement content, etc.), and/or other context data.

For each skill component 225/325, the system 120/device 110 may associate, in storage, the skill component's identifier with each rule corresponding to the skill component 225/325. As an example, the system 120/device 110 may store a rule indicating a video skill component may execute when a natural language input corresponds to a <Play Video> intent and the device (to be used to output a response to the natural language input) includes or is otherwise associated with a display. As another example, the system 120/device 110 may store a rule indicating a music skill component may execute when a natural language input corresponds to a <PlayMusic> intent and music is being output by a device when the device captures a natural language input. It will be appreciated that other examples are possible. The foregoing rules enable skill components 225/325 to be differentially proposed at runtime (e.g., based on NLU entities, NLU entity resolution identifiers, and context data) in systems where multiple skill components 225/325 are configured to execute with respect to the same intent.

The skill component proposer 710, using the received context data and the foregoing described skill component proposal rules, generates (808) data representing skill components 225/325 configured to process in response to the natural language input. Thus, in at least some embodiments, the skill component proposer 710 may be implemented as a rules engine. In at least some embodiments, the skill component proposer 710 may make binary (e.g., yes/no, true/false, etc.) determinations regarding whether a skill component 225/325 is configured to process in response to the natural language input. For example, the skill component proposer 710 may determine a skill component 225/325 is configured to process, in response to the natural language input, if the skill component 225/325 is associated with a rule corresponding to the NLU output data 585 (e.g., corresponding to an intent (and optionally one or more entities and/or entity resolution identifiers) represented in the NLU output data 585) and the context data.

In at least some embodiments, the skill component proposer 710 may generate data representing such binary determinations made with respect to all skill components 225/325 implemented by or otherwise in communication with the system 120/device 110. In at least some embodiments, the skill component proposer 710 may generate data representing such binary determinations made with respect to only a portion of the skill components 225/325 implemented by or otherwise in communication with the system 120/device 110 (for example only skill components 225/325 indicated as enabled in the context data received by the skill component proposer 710).

The skill component proposer 710 outputs (810) data 705 (illustrated in FIG. 7) including skill component identifiers. In at least some embodiments, the data 705 may include skill component identifiers with associated NLU hypotheses. For example, each skill component identifier, in the data 705, may be associated with a NLU hypothesis (represented in the NLU output data 585) to which the skill component proposer 710 determined the skill component's rule corresponds. The skill component proposer 710 may make binary determinations (as described above); as such, the skill component proposer 710 may not make any confidence determinations, and the skill component identifiers may be unranked in the data 705. An illustrative example of the data 705, that may be output by the skill component proposer 710, may be represented as:

Skill Component Identifier: 1ds532 Intent: <PlayMusic> AlbumName: GameOfThrones

Skill Component Identifier: jfdlk828 Intent: <Play Video> VideoTitle: GameOfThrones Skill Component Identifier: 434kll13 Intent: <Play Video> VideoTitle: GameOfThrones with the "Intent: <PlayMusic> Album Name: GameofThrones" and "Intent: <Play Video> VideoTitle: GameofThrones" portions of the data 705 corresponding to NLU hypotheses.

In at least some embodiments, the shortlister component 510 (of the NLU component 260/360) and the skill component proposer 710 may both be implemented by the system 120/device 110. In such instances, the shortlister component 510 and the skill component proposer 710 may process with respect to different skill components 225/325. For example, in at least some embodiments, the shortlister component 510 may process with respect to skill components 225/325 in communication with the system 120/device 110 (e.g., illustrated in FIGS. 2 and 3 as being outside of the system 120/device 110), and the skill component proposer 710 may process with respect to skill components 225/325 implemented by the system 120/device 110 (e.g., illustrated in FIGS. 2 and 3 as a component within the system 120/device 110). In such embodiments, skill component identifiers output by the shortlister component 510 (and associated NLU hypotheses) may be merged with the skill component identifiers and associated NLU hypotheses (output by the skill component proposer 710), and the merged data may be input to a rule engine 720 of the dynamic routing component 275. Alternatively, the skill component identifiers and associated NLU hypotheses (output by the shortlister component 510) and the skill component identifiers and associated NLU hypotheses (output by the skill component proposer 710) may be separately sent to the rule engine 720.

Figure 9:
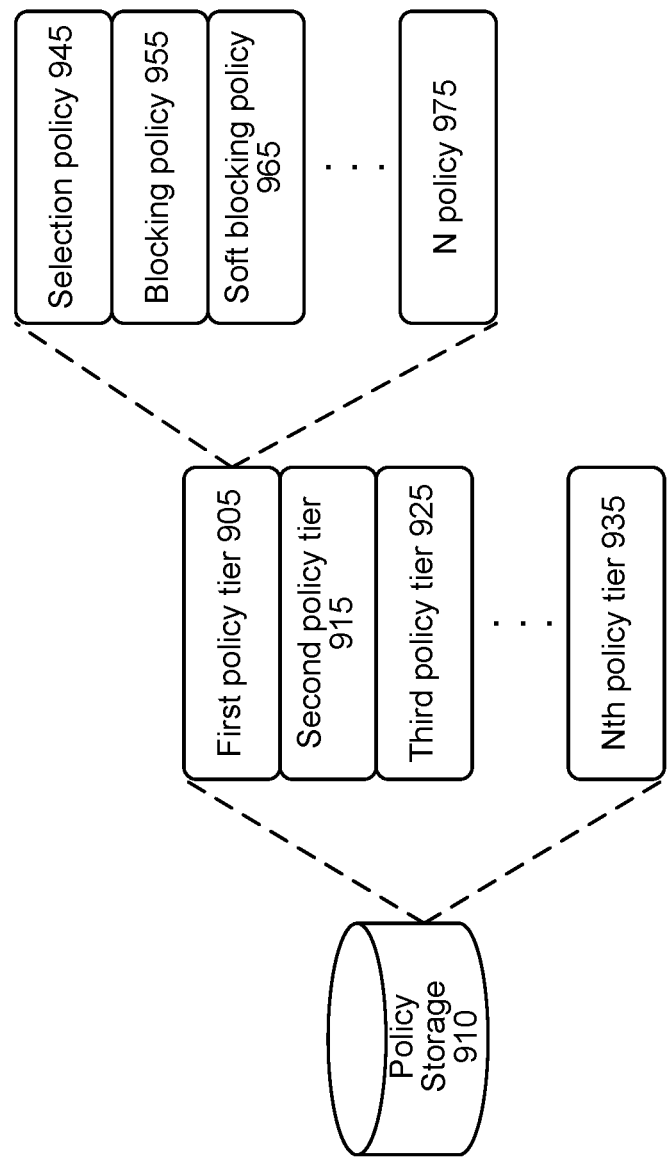
FIG. 9 is a conceptual diagram illustrating rules that may be stored by a rule storage, according to embodiments of the present disclosure.

The rule engine 720 may communicate with a rule storage 910 (stored by the system 120 or the device 110). The rule storage 910 may store various rule tiers. As illustrated in FIG. 9, the rule storage 910 may store a first rule tier 905 including one or more rules, a second rule tier 915 including one or more rules, a third rule tier 925 including one or more rules, up to an nth rule tier 935 including one or more rules.

In at least some embodiments, the first rule tier 905 may include one or more safety rules. As used herein, a "safety rule" refers to a rule corresponding to skill component processing that may be important to uphold for user well-being. For example, a safety rule may indicate a specific skill component (e.g., a specific communications skill component) is to process all natural language inputs corresponding to the <Call> intent and having an entity phone number of "911."

In at least some embodiments, the second rule tier 915 may include one or more privacy driven rules. As user herein, a "privacy driven rule" refers to a rule corresponding to skill component processing that may be required by privacy regulations and laws (such as the Children's Online Privacy Protection Act (COPPA), the Health Insurance Portability and Accountability Act (HIPAA), and the General Data Protection Regulation (GDPR)), or the like. For example, a privacy driven rule may be used to prevent a natural language input, received from a device 110 associated with a child user, from being processed using shopping skill component to make a purchase.

In at least some embodiments, the third rule tier 925 may include one or more contractually-obligated rules. As used herein, a "contractually-obligated rule" refers to a rule corresponding to skill component processing whose violation may result in a dispute regarding breach of a legal contract. For example, a contractually-obligated rule may indicate all natural language inputs, captured by vehicles (a type of device 110) and relating to vehicle maintenance, are to be processed using a particular vehicle manufacturer skill component.

While the foregoing describes specific rule tiers, it will be appreciated that the present disclosure is not limited thereto. The present disclosure envisions various rule tiers corresponding to various types of rules.

In at least some embodiments, the rule tiers may be manually configured by a human. In at least some other embodiments, the rule tiers may be automatically configured using a ML model(s). For example the ML model(s) may process all rules, in the rule storage 910, to categorize the rules into discrete tiers.

Various ML techniques may be used to train and operate the ML model(s) as ML models may be trained and operated according to various ML techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

As illustrated in FIG. 9, a rule tier (not just the first rule tier 905 as illustrated in FIG. 9) may include one or more selection rules 945. A "selection rule" requires selection of a particular skill component when one or more conditions are met. That is, only the skill component corresponding to the selection rule is valid when the condition(s) is met; every other skill is invalid. As an example, a selection rule (in a "safety" rule tier) may indicate all skill components (of or otherwise associated with the system 120 device 110), except a particular skill component, are invalid when a natural language input corresponds to a <Call> intent and has an entity value of "911." For further example, a selection rule (in a "privacy" rule tier) may indicate all skill components, except a skill component that causes the device 110 to enter a sleep state (i.e., low powered state), are invalid when a natural language input corresponds to a <GoToSleep> intent. In another example, a selection rule (in a "contractually-obligated" rule tier) may indicate all skill components, except a particular vehicle manufacturer skill component, are invalid when a natural language input is captured by a vehicle (a type of device 110) and relates to vehicle maintenance.

A rule tier (not just the first rule tier 905 as illustrated in FIG. 9) may additionally or alternatively include one or more blocking rules 955. A "blocking rule" causes one or more skill components to be removed from consideration for purposes of determining which skill component to route a present natural language input to. Multiple blocking rules of a single tier may be applied simultaneously and may be implemented as additive in nature. As an example, a blocking rule (in a "safety" rule tier) may indicate skill components, that engage in multiple, sequential skill component outputs and user inputs (such as, but not limited to, restaurant reservation skills, plane ticket booking skills, taxi booking skills, etc.), are to be blocked (i.e., not output as potential skill components by the rule engine 720) when the device 110 that captured the present natural language input is a vehicle.

As described herein above, a skill component proposal rule (implemented by the skill component proposer 710) indicates a particular skill is capable of processing when certain conditions are met. In contrast, a rule of the present disclosure (implemented by the rule engine 720) is applied across different skill components. Rules of the present disclosure provider deterministic behavior that improves the user experience by increasing a likelihood that a natural language input will be processed using an intended skill component.

A rule may be specific to one or more types of context data. Example types of context data include NLU data (such as intent and entity value), user profile data (representing things such as a user age, primary language of a user, and a geographic location of the user), device profile data (representing things such as device type (e.g., vehicle, displayless device, etc.), and geographic location of a device). For example, a rule may be specific (may be triggered with respect) to context data representing a <Call> intent and an entity value of "911." For further example, a rule may be specific (may be triggered with respect) to context data representing a <GoToSleep> intent. In another example, a rule may be specific (may be triggered with respect) to context data representing a "vehicle" device type and a <ScheduleMaintenance> intent. For further example, a rule may be specific (may be triggered with respect) to context data representing a "hotel" device type and a <BookTaxi> intent. In another example, a rule may be specific (may be triggered with respect) to context data representing a "communal" device type and a <RoomService> intent. For further example, a rule may be specific (may be triggered with respect) to context data representing a "child" user (e.g., a user below 18 years of age) and a <Shopping> intent.

Figure 10:
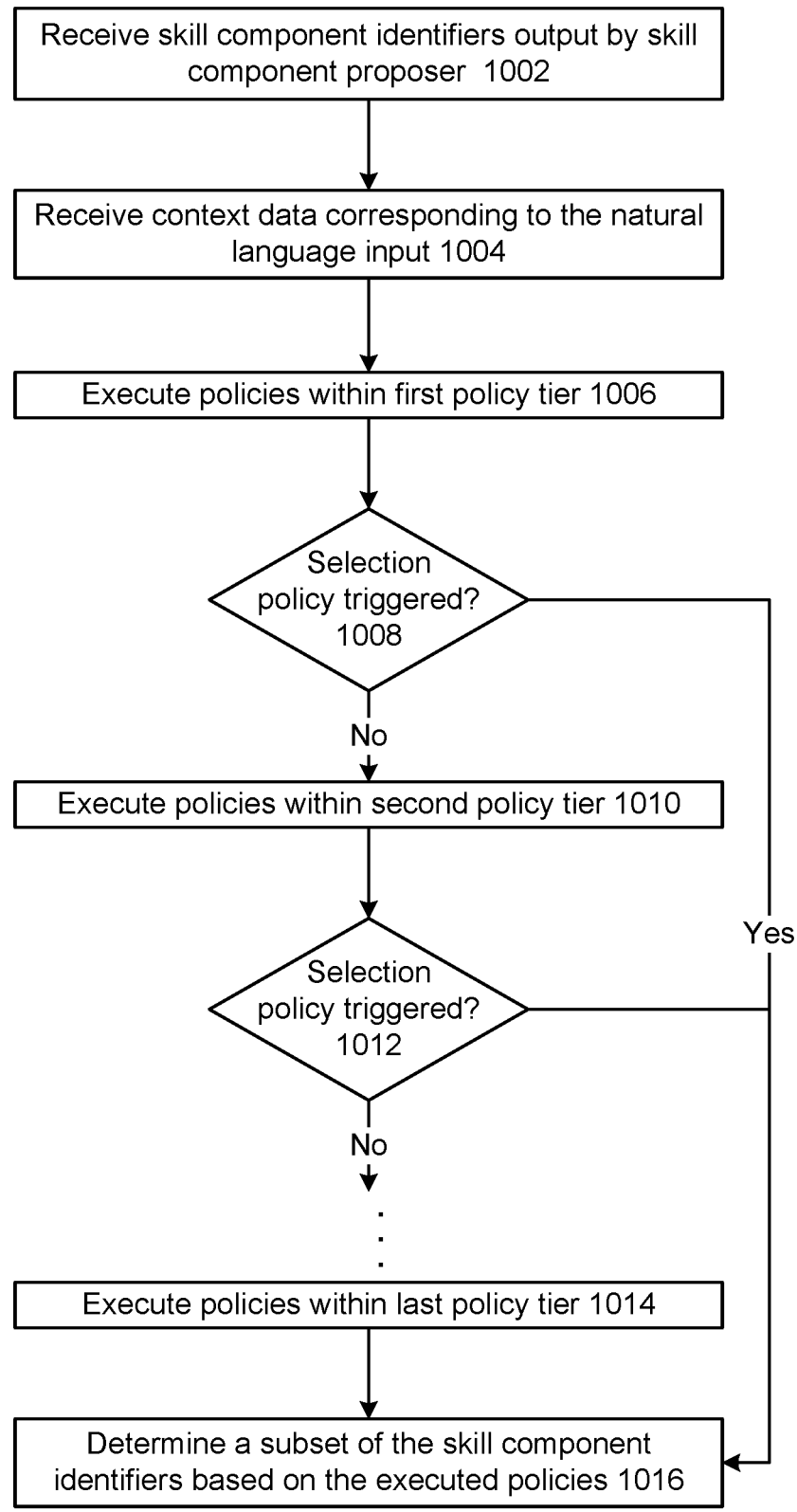
FIG. 10 is process flow diagram illustrating how a rule engine may implement rules to determining skill components that may process a natural language input, according to embodiments of the present disclosure.

FIG. 10 is an example of how the rule engine 720 may perform processing at runtime to execute one or more rules detailed above. As illustrated in FIG. 10, the rule engine 720 receives (1002) the skill component identifiers determined and output by the skill component proposer 710.

The rule engine 720 also receives (1004) context data corresponding to the natural language input. The context data may indicate, for example, an intent of the natural language input, one or more entity values determined by a NER component 462 with respect to the natural language input, one or more user characteristics of the user 5 (such as the user's age, the user's primary language, a geographic location of the user, etc.), a device type of the device 110 that captured the natural language input, a device type of the device 110 to be used to output a response to the natural language input (which may be the same or different from the device that captured the natural language input), a geographic location of the device 110 that captured the natural language input (which may be represented in device profile data associated with the device 110), a geographic location of the device 110 to be used to output a response to the natural language input (which may be represented in device profile data associated with the device 110), and/or other context data associated with the natural language input. In at least some embodiments, the rule engine 720 may receive the context data in response to the rule engine 720 causing a context data query 605 to be sent to the context aggregation component 265/365.

Generally, the rule engine 720 may execute the rules in a tiered manner. Moreover, the rule engine 720 may execute all rules within a tier. For example, the rule engine 720 may first execute (1006) the first rule tier 905 based on the first rule tier 905 being a highest priority rule tier in the rule storage 910.

The rule engine 720 may be configured to only execute a lower rule tier if a selection rule is not triggered in an executed rule tier. In other words, for example, the rule engine 720 may only execute the second rule tier 915 if a selection rule of the first rule tier 905 is not triggered (i.e., does not correspond to the context data corresponding to the natural language input). In other words, the rule engine 720 may continue executing lower rule tiers (in a tiered manner), regardless of how many blocking rules corresponding to (are triggered by) the context data (corresponding to the natural language input), provided a selection rule does not correspond to (is not triggered by) the context data.

However, the rule engine 720 may execute all rules of a rule tier even if a selection rule of the rule tier is triggered. In other words, the rule engine 720, when executing a rule tier, may determine one or more selection rules and one or more blocking rules correspond to (are triggered by) the context data corresponding to the natural language input.

Referring to FIG. 10, the rule engine 720 determines (1008) whether a selection rule, of the first rule tier 905, is triggered by (corresponds to) the context data corresponding to the natural language input. If the rule engine XX20 determines no selection rule of the first rule tier 905 is triggered by (corresponds to) the context data, the rule engine 720 executes (1010) rules within the second rule tier 915. Thereafter, the rule engine 720 determines (1012) whether a selection rule, of the second rule tier 915, is triggered by (corresponds to) the context data. The rule engine 720 performs the foregoing tiered rule executions and selection rule determinations with respect to each rule tier in the rule storage 910. If no selection rules are triggered by (correspond to) the context data, the rule engine 720 may eventually execution (1014) rules within a last rule tier (e.g., the nth rule tier 935 in FIG. 9).

As described herein above, a blocking rule indicates one or more skill components that are not valid for purposes of being called to process. Moreover, a selection rule indicates all skill components, but one or more particular skill components, are invalid for purposes of being called to process. Thus, at some point, the rule engine 720 may determine (1016) a subset of the skill component identifiers based on the executed rules. For example, if the rule engine 720 determines (at decision point 1008) that a selection rule of the first rule tier is triggered, the rule engine 720 may determine the subset of skill component identifiers to not include any skill component identifiers indicated as invalid based on the selection rule. In other words, the rule engine 720 may determine the subset of skill component identifiers to only include one or more skill component identifiers specifically associated with the selection rule. For further example, if the rule engine 720 determines (at decision point 1012) that a selection rule of the second rule tier is triggered, the rule engine 720 may determine the subset of skill component identifiers to not include any skill component identifiers indicated as invalid based on the selection rule. If the rule engine 720 executes the last rule tier and does not determine a selection rule, of the last rule tier, is triggered by (corresponds to) the context data, the rule engine 720 determines the subset of skill component identifiers to not include one or more skill component identifiers indicated as invalid by one or more blocking rules (of the various rule tiers) triggered by (corresponding to) the context data. The foregoing tiered rule execution technique may ensure a rule tier's "chosen" skill component identifier (i.e., corresponding to a triggered selection rule of the tier) is not removed from the subset of skill component identifiers by a blocking rule of a lower rule tier. Moreover, the foregoing tiered rule execution technique may minimize rule evaluation at runtime to only rules that need to be evaluated (e.g., if a selection rule is triggered, no need to evaluate rules of lower rule tiers). Such may decrease user-perceived processing latency.

The rule engine 720 may output the subset 715 of skill component identifier, which may be input to a skill component pre-response component 730 of the dynamic routing component 275/375. The skill component pre-response component 730 may be configured to query skill components 225/325 for pre-responses. A pre-response may represent how a skill component may process if called to respond to the natural language input, and may optionally include a variety of other data representing a strength of the skill component's response. In at least some embodiments, this other data may correspond to context data available to the skill component 225/325 but not the context aggregation component 265/365 (e.g., this context data may be stored in one or more storages in communication with the skill component 225/325 but not the context aggregation component 265/365). For example, a pre-response may indicate a skill component 225/325 can personalize a response using profile data accessible to the skill component 225/325 (and may indicate the types of profile data accessible); a pre-response may indicate a skill component 225/325 can respond but cannot personalize the response; a pre-response may indicate a user does not have a subscription with the skill component 225/325, but that the skill component 225/325 can respond using free functionality of the skill component 225/325; etc.

Figure 11:
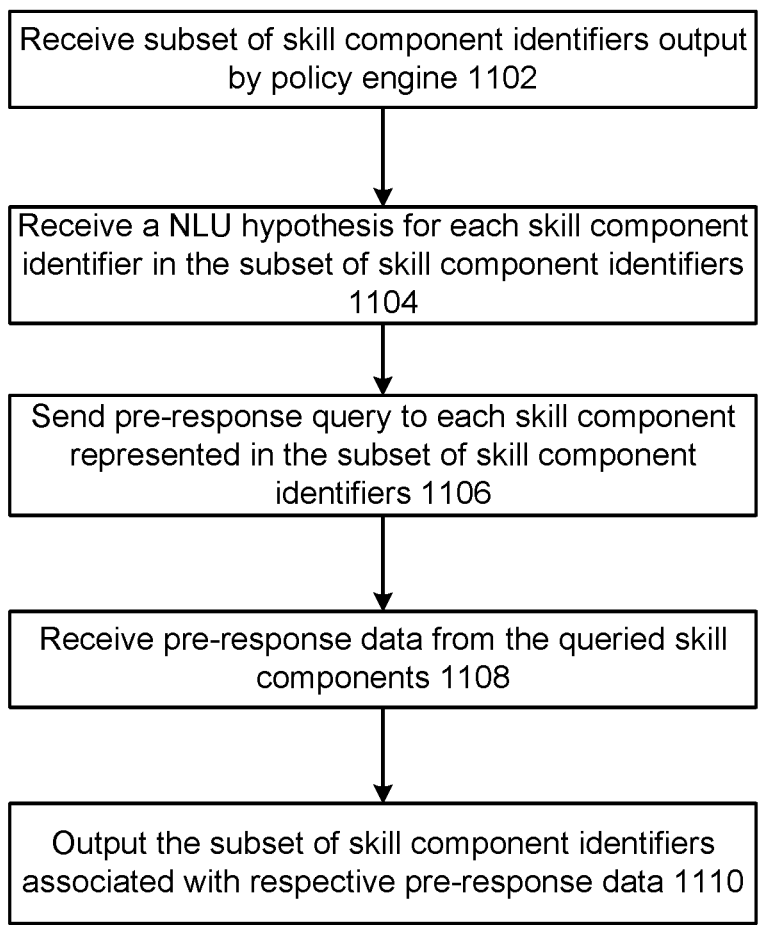
FIG. 11 is process flow diagram illustrating how a skill component pre-response component may determine pre-responses of skill components, according to embodiments of the present disclosure.

As illustrated in FIG. 11, after the skill component pre-response component 730 receives (1102) the subset of skill component identifiers output by the rule engine 720, the skill component pre-response component 730 may receive (1104) a NLU hypothesis for each skill component identifier in the subset of skill component identifiers. In at least some embodiments, the skill component pre-response component 730 may receive the NLU hypotheses as context data in response to causing a context data query 605 to be sent to the context aggregation component 265/365.

The skill component pre-response component 730 sends (1106) a pre-response query to each skill component 225/325 associated with a skill component identifier in the subset of skill component identifiers. A pre-response query may include a NLU hypothesis (associated with the skill component 225/325 receiving the pre-response query) and optionally other context data corresponding to the natural language input.

A skill component 225/325 may determine, based on a received pre-response query (and optionally other data available to the skill component 225/325), whether the skill component 225/325 could respond to the natural language input. For example, a skill component 225/325 may generate a pre-response indicating the skill component 225/325 can respond to the natural language input, indicating the skill component 225/325 may be able to respond to the natural language input (e.g., the indicating the skill component 225/325 needs more data to determine whether the skill component 225/325 can respond to the natural language input), or indicating the skill component 225/325 cannot respond to the natural language input (e.g., due to present processing load).

In situations where a skill component's pre-response indicates the skill component 225/325 can or may be able to respond to the natural language input, the pre-response may also include various other data representing a strength of the skill component's potential response to the natural language input. Such other data may correspond to data available to the skill component 225/325 but not the context aggregation component 265/365. Such other data may positively influence the skill component's runtime ranking as described herein below. For example, such other data may indicate capabilities (e.g., output capabilities or components such as a connected screen, loudspeaker, etc.) of a device to be used to output the skill component's response; pricing data corresponding to a product or service the natural language input is requesting be purchased (or is requesting purchase data for); availability of a product the natural language input is requesting be purchased; whether there are shipping fees for a product the natural language input is requesting be purchased; whether the user 5 already has a profile and/or subscription with the skill component 225/325; that the user 5 does not have a subscription with the skill component 225/325, but that there is a free trial/tier the skill component 225/325 is offering; with respect to a taxi skill component, a cost of a trip based on start and end locations, how long the user 5 would have to wait to be picked up, etc.; and/or other data available to the skill component 225/325 that is related to the skill component's processing of the natural language input. In at least some embodiments, a skill component's pre-response may include a flag (or other indicator) representing a strength of the skill component's ability to personalize its response to the user 5.

In at least some embodiments, a skill component's pre-response may be configured to a schema pre-defined by the system 120/device 110. By the system 120/device 110 requiring pre-responses to conform to a specific schema (e.g., by requiring skill components 225/325 to only be able to provide certain types of data in pre-responses), the system 120/device 110 may onboard new skill components 225/325 into the dynamic routing functionality described herein without needing to reconfigure the dynamic routing component 275/375 each time a new skill component 225/325 is onboarded. Moreover, requiring pre-responses to conform to a schema limits the amount of values needed to be used to train and implement a ML model for ranking skill components 225/325 at runtime, as described herein below.

The skill component pre-response component 730 may receive (1108) pre-response data from the queried skill components 225/325, and output (1110) the subset of skill component identifiers associated with respect pre-response data. As indicated above, a skill component's pre-response data may indicate the skill component 225/325 would be unable to process if called to execute with respect to the present natural language input. In at least some embodiments, the skill component pre-response component 730 may only output a portion, of the subset of skill component identifiers, associated with pre-response data that does not indicate an associated skill component would be unable to process. The data, output by the skill component pre-response component 730, may not include any confidence scores representing associated skill components 225/325 should be used to respond to the natural language input.

Figure 12:
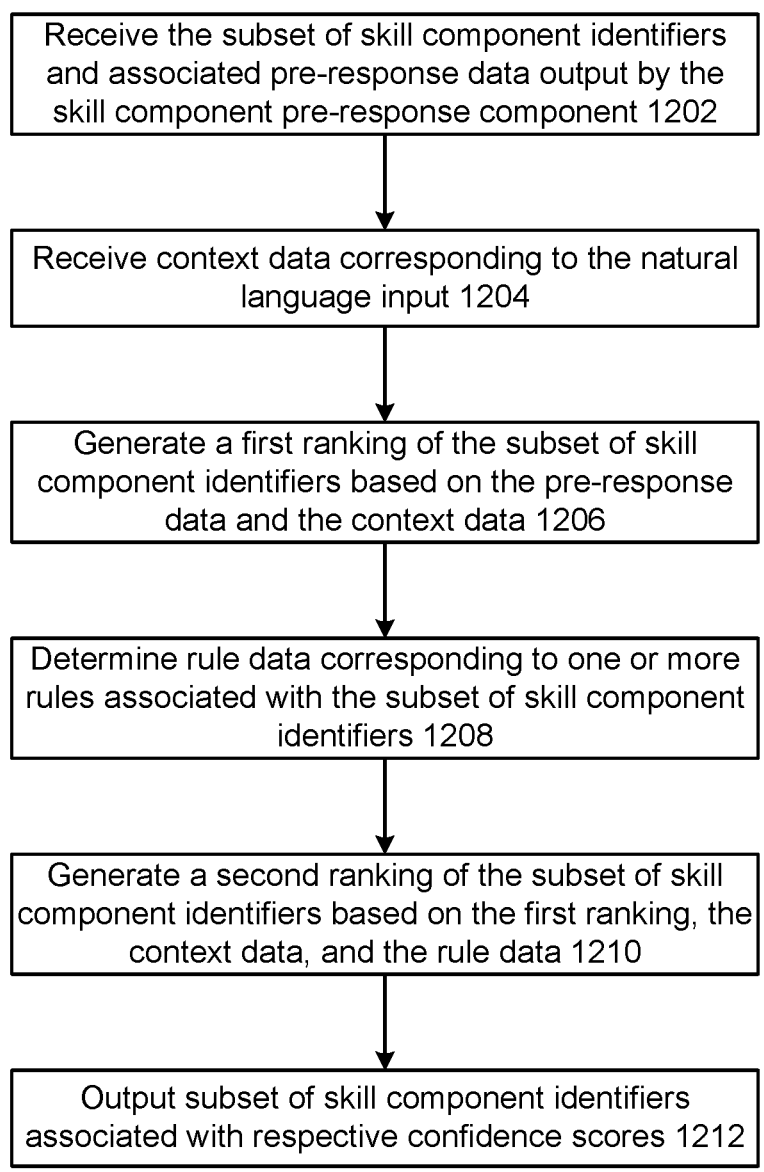
FIG. 12 is process flow diagram illustrating how a skill component ranker may rank skill components at runtime, according to embodiments of the present disclosure.

Referring to FIG. 12, the data 725, output by the skill component pre-response component 730, may be received (1202) by a skill component ranker 740 of the dynamic routing component 275/375. The skill component ranker 740 also receives (1204) context data corresponding to the natural language input. Such context data may indicate, for example, one or more preferences (e.g., skill component 225/325 preferences) of the user 5 (as represented in a user profile or group profile stored in the profile storage 270), one or more domains corresponding to the natural language input, one or more intents representing the natural language input, NER entity values as represented in the NLU output data 585, a measure of success of entity resolution performed with respect to the natural language input, text representing the natural language input, rankings of individual NLU hypotheses within the NLU output data 585, a type of the device 110 that received the natural language input, a type of the device 110 that is to be used to output a response to the natural language input, whether the device 110 (that received the natural language input) was outputting audio when the natural language input was received, whether the device 110 (that received the natural language input) was outputting video when the natural language input was received, and/or other context data available to the system 120/device 110. In at least some embodiments, the skill component ranker 740 may receive the context data by causing a context data query 605 to be input to the context aggregation component 265/365.

The skill component ranker 740 may generate (1206) a first ranking of the subset of skill component identifiers based on the pre-response data and the context data. Things that may increase a skill component identifier's ranking include, for example, that the skill component identifier is associated with pre-response data indicating a corresponding skill component 225/325 can generate a response (to the natural language input) that is personalized to the user 5, that a NLU hypothesis corresponding to the skill component identifier is associated with a confidence score meeting or exceeding a threshold confidence score, that the skill component identifier corresponds to a music skill component when the device 110 was outputting music when the natural language input was received, that the skill component identifier corresponds to a video skill component and the device 110 was outputting video when the natural language input was received, etc. Things that may decrease a skill component identifier's ranking include, for example, that the skill component identifier is associated with pre-response data indicating a corresponding skill component 225/325 cannot generate a response (to the natural language input) that is personalized to the user 5, that a NLU hypothesis corresponding to the skill component identifier is associated with a confidence score falling below a threshold confidence score, that the skill component identifier corresponds to a video skill component and the device 110 was outputting music when the natural language input was received, that the skill component identifier corresponds to a music skill component and the device 110 was outputting video when the natural language input was received, etc. Other example are possible and will depend on the context data available to the skill component ranker 740.

In at least some embodiments, the skill component ranker 740 may generate the first ranking using a machine learned model. In at least some embodiments, the machine learned model may be a DNN. For example, the skill component ranker 740 may input, to the machine learned model, the pre-response data and the context data, and may receive (as output from the machine learned model) the first ranking of skill component identifiers.

The skill component ranker 740 may determine (1208) rule data corresponding to one or more rules associated with the subset of skill component identifiers. A rule, determined and implemented by the skill component ranker 740, refers to data, generated from skill component developer-provided information, used by the skill component ranker 740 to make a binary (e.g., yes/no, true/false, etc.) determination, based on context data, as to whether a skill component should be invoked. A skill component developer (e.g., a user of the system 120 that provides the system 120 with data for creating or otherwise configuring a skill component) may provide the system 120 with data indicating the skill component developer's skill component should be invoked when a natural language input corresponds to one or more certain types of context data (e.g., when the natural language input is captured by a user device of a certain type or having certain characteristics; when a user device, that captured the natural language input, is in a particular state when the natural language input is captured; when the natural language input is captured during a certain time of day; when the user device, that captured the natural language input, is located in a particular geographic location; etc.). The system 120 may generate a rule based on such data.

The skill component ranker 740 may generate (1210) a second ranking of the subset of skill component identifiers based on the first ranking, the context data, and the rule data. For example, each of the skill component identifiers may be associated with rule data corresponding to one or more rules. If the skill component ranker 740 determines rule data corresponds to the context data, the skill component ranker 740 may increase a ranking of the skill component identifier associated with the rule data. In at least some embodiments, if the skill component ranker 740 determines rule data corresponds to the context data, the skill component ranker 740 may make the skill component identifier (associated with the rule data) a top-ranked skill component identifier in the second ranking. However, in at least some embodiments, the skill component ranker 740 may not decrease a skill component identifier's ranking simply because rule data (associated with the skill component identifier) does not correspond to the context data. In at least some embodiments, the skill component ranker 740 may not generate the second ranking based simply on rule data associated with the subset of skill component identifiers, but instead may generate the second ranking based on all rule data accessible to the skill component ranker 740.

In at least some embodiments, rule data may be written in YAML Ain't Markup Language (YAML), which is a human-readable data-serialization language. In at least some embodiments, the skill component ranker 740 may implement a rule-based java library to match rule data to context data.

For example, in at least some embodiments the skill component ranker 740 may only implement rule data at runtime when performance of a machine learned model (implemented by the skill component ranker 740) is unsatisfactory [e.g., the machine learned model outputs a confidence value failing to satisfy a condition (e.g., a threshold confidence value)].

The skill component ranker 740 outputs (1208) the subset of skill component identifiers associated with respective confidence scores. A confidence score, in this context, represents a confidence that the associated skill component 225/325 is to be called to generate a response to the natural language input. Such a confidence score may be a numeric score (e.g., between 0 and 1) or a binned score (e.g., low, medium, high).

A decider component 750 (of the dynamic routing component 275/375) may receive the data 735 output by the skill component ranker 740. The decider component 750 is configured to generate an execution plan 745 based on the data 735 (representing the subset of skill component identifiers associated with respective confidence scores) and context data (e.g., representing NLU hypotheses associated with the subset of skill component identifiers). In at least some embodiments, the decider component 750 may receive the context data by causing a context data query 605 to be sent to the context aggregator component 265/365.

In at least some embodiments, the execution plan 735 may include the skill component identifier (of the subset of skill component identifiers) associated with the highest confidence score, a NLU hypothesis associated with the top-scoring skill component identifier, and an instruction to invoke the skill component 225/325 (corresponding to the top-scoring skill component identifier) to respond to the natural language input. In response to receiving such an execution plan 745, the orchestrator component 230/LRO 328 may invoke the skill component 225/325 (corresponding to the top-scoring skill component identifier) by sending the NLU hypothesis to the skill component 225/325 along with an instruction to generate a response.

In at least some embodiments, the execution plan 745 may indicate further data is needed from the user 5 in order for the dynamic routing component 275/375 to adequately determine which skill component 225/325 should be invoked. In response to receiving such an execution plan 745, the orchestrator component 230/LRO 328 may engage the user 5 to gather the further needed data (e.g., by causing the device 110 to output synthesized speech and/or visual content requesting the further data, and the device 110 capturing a further natural language input(s) corresponding to the further needed data). It will be appreciated that the foregoing are merely illustrative execution plans 745 and subsequent processing, and that the decider 750 may output other execution plans 745 causing other processing without departing from the present disclosure.

In at least some embodiments, a rule tier may include more than one selection rule. In such embodiments, the rule engine 720 could remove all skill component identifiers but those corresponding to the selection rules, and the skill component identifiers (corresponding to the selection rules) could be input to the skill component ranker 740. In an alternative implementation, instead of processing the skill component identifiers (corresponding to the triggered selection rules) using the skill component pre-response component 730, the skill component ranker 740, and the decider 750, the dynamic routing component 275/375 may cause the device 110 to output synthesized speech and/or display content requesting user input selecting one of the multiple skill components corresponding to the multiple-triggered selection rules. In response, the device 110/system 120 may receive a natural language input selecting one of the skill components, and the device 110/system 120 may call the selected skill component to process. The foregoing processing (or querying the user 5 for the skill component to invoke) may also be implemented in the situation where a single rule tier includes a triggered selection rule and a triggered blocking rule blocking the skill component corresponding to the selection rule. In such cases, the user may be queried as to whether the user 5 wants the skill component (corresponding to the triggered selection rule) to be invoked. In at least some embodiments, where a single rule tier includes a triggered selection rule and a triggered blocking rule blocking the skill component corresponding to the selection rule, the rule engine 720 may prioritize the selection rule over the blocking rule, and may output the skill component identifier of the skill component corresponding to the selection rule.

Referring back to FIG. 9, a rule tier may include a "soft blocking" rule. When a soft blocking rule is triggered at runtime, one or more skill component identifiers may be indicated (e.g., tagged) as "blocked" but may nonetheless be included in the subset of skill component identifiers output by the rule engine 720. In such situations, the skill component ranker 740 may take such indicating (e.g., tagging) into consideration when determining respective confidence scores for the skill component identifiers input therein. For example, the skill component ranker 740 may lower a confidence score associated with a skill component identifier indicated as being blocked (e.g., associated with a blocked tag) and/or may increase a confidence score associated with a skill component identifier not indicated as being blocked (e.g., not associated with a blocked tag). If the decider 750 determines the top-scoring skill component identifier, input to the decider 750, is indicated as being blocked (e.g., is associated with a blocked tag), the decider 750 may determine a skill component 225/325 should not be called to respond to the natural language input. In such instances, the decider 750 may cause the device 110 to output synthesized speech and/or display text corresponding to "sorry, but I could not process that" or the like. The foregoing soft blocking technique may provide a more refined ranking of skill component identifiers as compared to the implementation where a blocking rule prevents a skill component identifier from being ranked by the ML-based skill component ranker 740.

As described above, the rule engine 720 may be implemented between the skill component proposer 710 and the skill component pre-response component 730. Such may reduce the cognitive overload experienced by downstream components of the dynamic routing component 275/375.

In at least some embodiments, the rule engine 720 may be implemented between the skill component pre-response component 730 and the skill component ranker 740. In such embodiments, the skill component pre-response component 730 may determine pre-response data for one, some, or all of the skill components corresponding to the skill component identifiers 705 output by the skill component proposer 710. The skill component identifiers 705 (and associated pre-response data) may be input to the rule engine 720. The rule engine 720 may process as described herein (and additionally with respect to the pre-response data) to determine a subset of skill component identifiers and associated pre-response data, which may then be input to the skill component ranker 740 to process as described herein.

Figure 13:
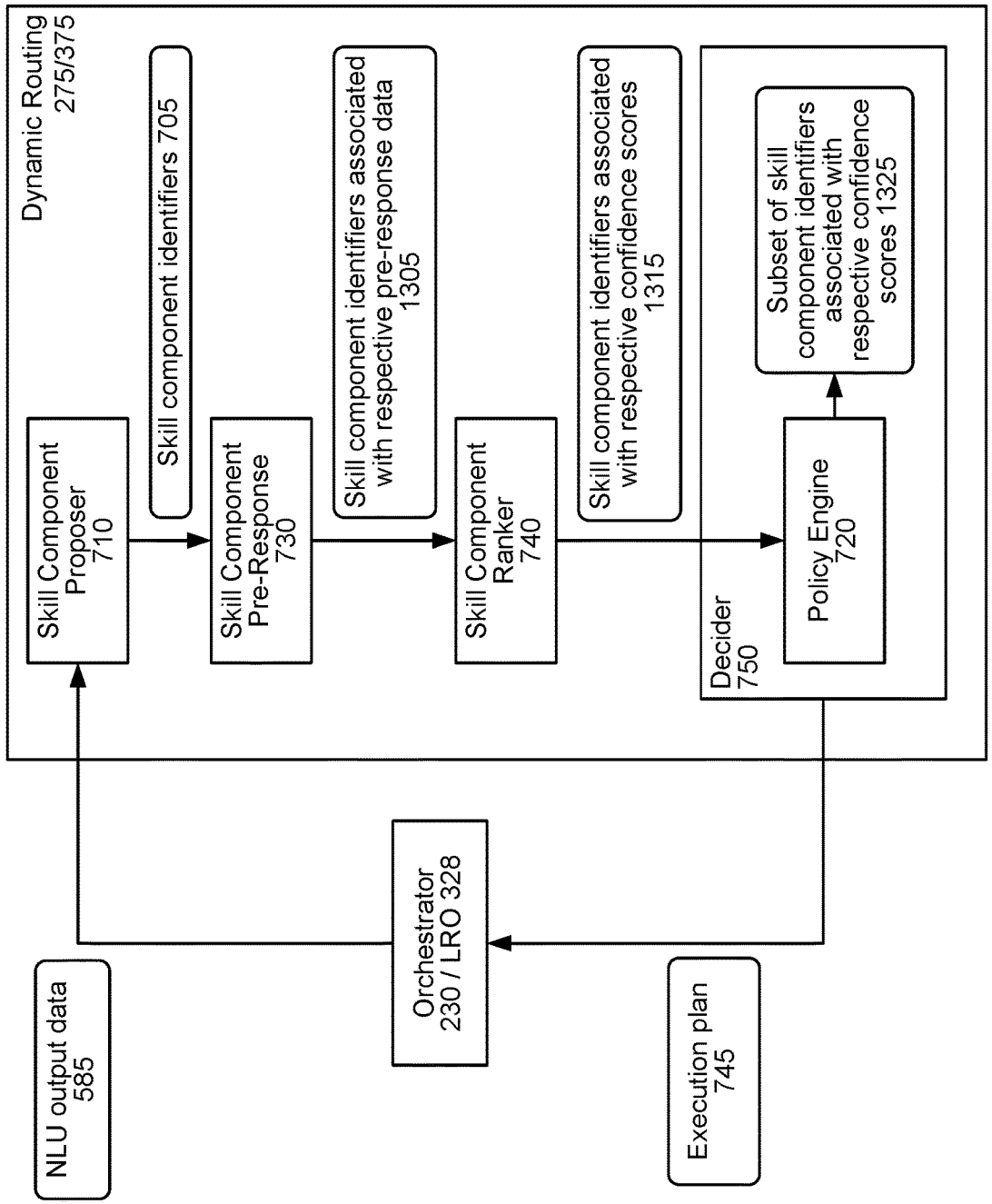
FIG. 13 is a conceptual diagram illustrating how dynamic selection of a skill component may be performed at runtime, according to embodiments of the present disclosure.

In at least some embodiments, the rule engine 720 may instead be implemented as part of the decider 750. In such embodiments, as illustrated in FIG. 13, the skill component proposer 710 may process as described herein, with respect to FIG. 8, to determine skill component identifiers 7065 representing skill components 225/325 capable of processing with respect to natural language input. The skill component pre-response component 730 may then process as described herein, with respect to FIG. 11, to determine data 1305 including the skill component identifiers associated with respective pre-response data. The skill component ranker 740 may then process as described herein, with respect to FIG. 12, to output data 1315 including the skill component identifiers associated with respective confidence scores. The data 1315 may be input to the rule engine 720. The rule engine 720 may then process, as described herein, with respect to FIG. 10, to determine data 1325 including a subset of the skill component identifiers associated with respect confidence scores. The decider 750 may process (as described herein) the data 1325 to determine the execution plan 745.

In at least some embodiments, initially configured rule tiers, in the rule storage 910, may be fractionalized based on user feedback data corresponding to runtime implementation of the rule tiers. For example, if user feedback data indicates a first blocking rule of a tier is routinely negatively blocking a skill component corresponding to a second blocking rule of the same tier, the rule storage 910 may be reconfigured to move the first blocking rule to a lower tier in the rule storage 910.

Once a rule is stored in the rule storage 910 and implemented at runtime, one or more metrics may be used to monitor the performance of the rule. Example metrics that may be monitored include, but are not limited to, a number of times the rule has been triggered, a total number of natural language inputs with respect to which the rule was evaluated, a percentage of natural language inputs the rule was triggered with respect to, and a number of times the rule has conflicted with another rule (of the same or another rule tier). One or more adjustments may be made to a rule based on the one or more metrics.

Figure 14:
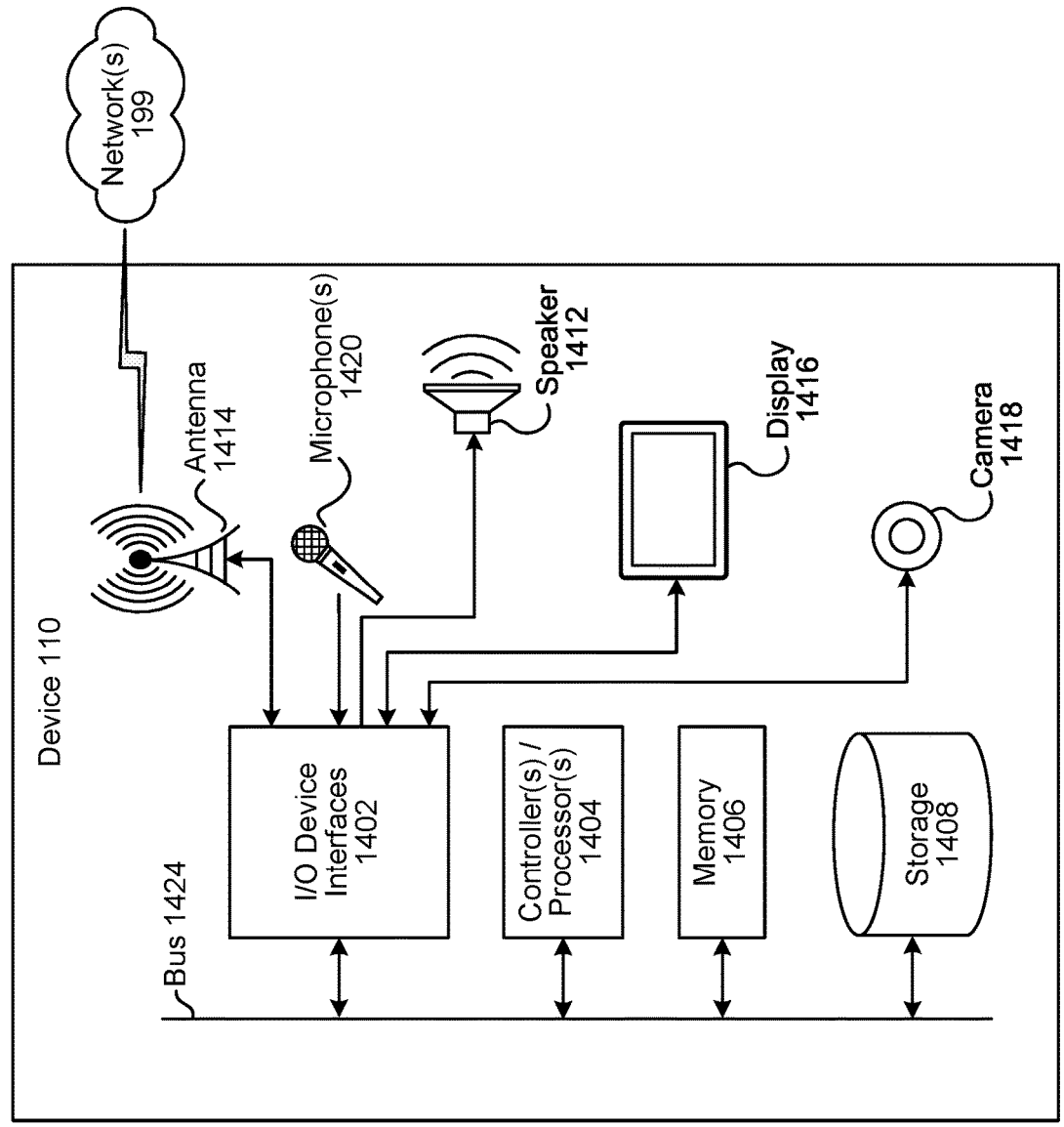
FIG. 14 is a block diagram conceptually illustrating example components of a device, according to embodiments of the present disclosure.
Figure 15:
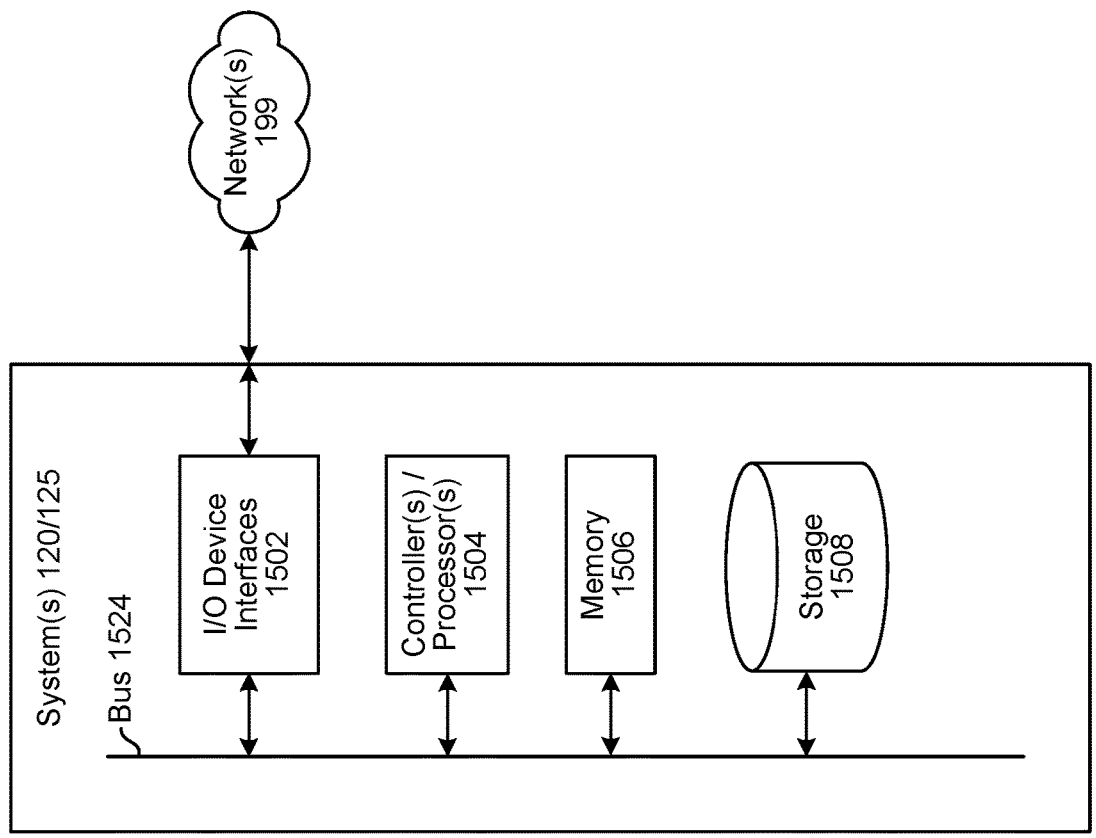
FIG. 15 is a block diagram conceptually illustrating example components of a system, according to embodiments of the present disclosure.

FIG. 14 is a block diagram conceptually illustrating a device 110 that may be used with the system 120. FIG. 15 is a block diagram conceptually illustrating example components of a remote device, such as the system 120, which may assist with ASR processing, NLU processing, etc.; and a skill component 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill component 125, etc. In operation, each of these systems may include computer-readable and computer-executable instructions that reside on the respective device (120/125), as will be discussed further below.

Each of these devices (110/120/125) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120/125) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1402/1502).

Computer instructions for operating each device (110/120/125) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120/125) includes input/output device interfaces (1402/1502). A variety of components may be connected through the input/output device interfaces (1402/1502), as will be discussed further below. Additionally, each device (110/120/125) may include an address/data bus (1424/1524) for conveying data among components of the respective device. Each component within a device (110/120/125) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1414, the input/output device interfaces 1402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device 110, the system 120, and/or a skill component 125 may include their own dedicated processors, memory, and/or storage. Alternatively, one or more of the components of the device 110, the system 120, and/or a skill component 125 may utilize the I/O interfaces (1402/1502), processor(s) (1404/1504), memory (1406/1506), and/or storage (1408/1508) of the device(s) 110, system 120, or the skill component 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill component 125, as described herein, are illustrative, and may be located as a stand-alone device or may be included, in whole or in part, as a component of a larger device or system.

Figure 16:
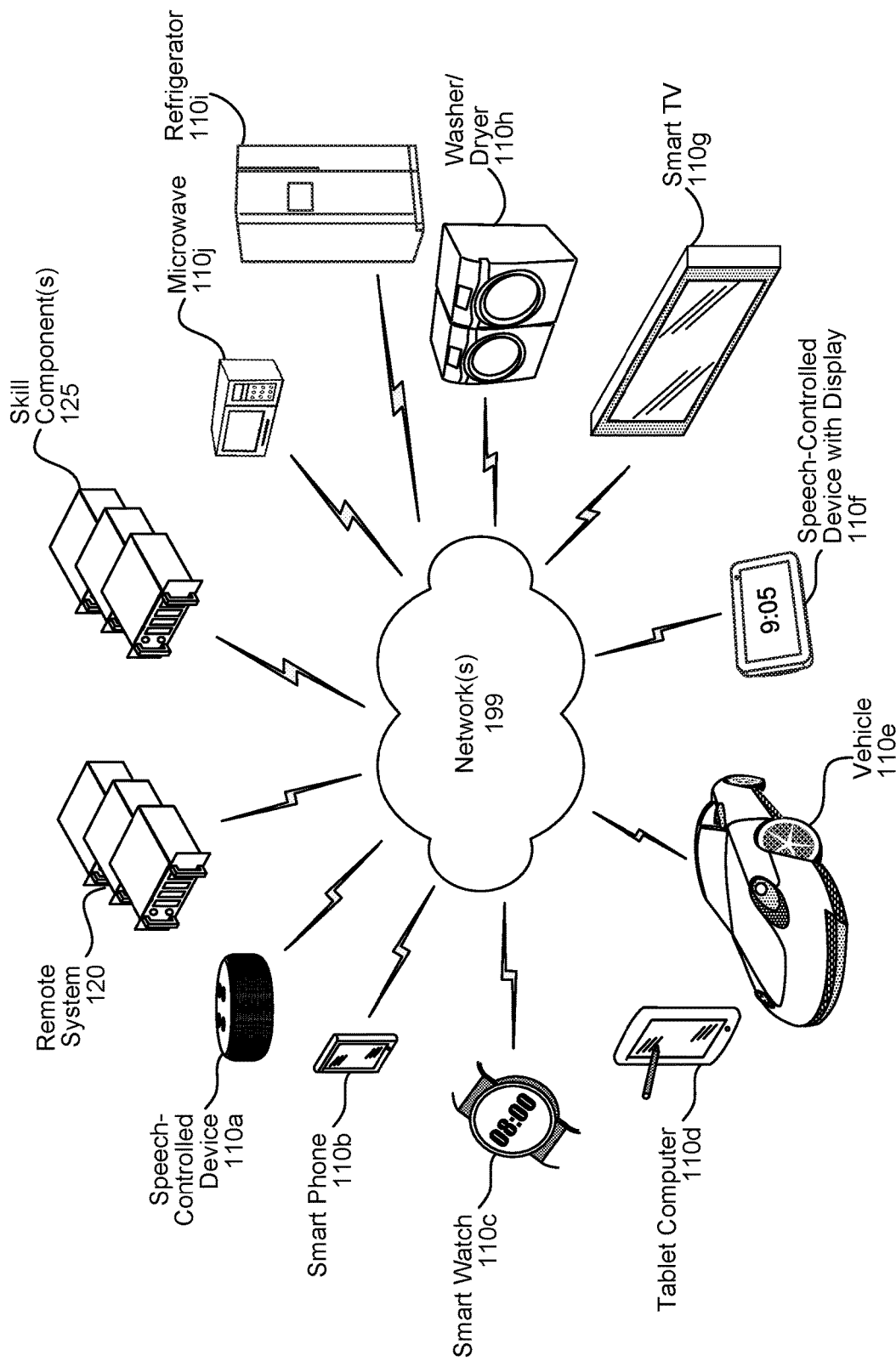
FIG. 16 illustrates an example of a computer network for use with the overall system, according to embodiments of the present disclosure.

As illustrated in FIG. 16, multiple devices (110*a*-110*j*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a display device 110*f*, a smart television 110*g*, a washer/dryer 110*h*, a refrigerator 110*i*, and/or a microwave 110*j* may be connected to the network(s) 199 through a wireless service provider, over a WiFi or cellular network connection, or the like. Other devices are included as network-connected support devices, such as the system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first data corresponding to a first natural language input;
   determining a first plurality of processing components configured to generate first output data responsive to the first natural language input, the first plurality of processing components corresponding to a processing component type and comprising a first processing component, a second processing component, and a third processing component;
   determining, from a storage, a first rule representing when the first processing component is to be prevented from processing to generate output data responsive to natural language inputs;
   determining a second plurality of processing components configured to generate the first output data, the second plurality of processing components corresponding to the processing component type and comprising the second processing component and the third processing component, wherein the first processing component is excluded from the second plurality of processing components based on the first rule;
   determining, from the storage, a second rule indicating all but the second processing component, of the processing component type, are to be prevented from processing the first data;
   determining, from the storage, a third rule indicating all but the third processing component, of the processing component type, are to be prevented from processing the first data;
   sending, to a device and based at least on the second rule and the third rule, a request for selection of the second processing component or the third processing component;
   after sending the request, receiving, from the device, second data representing selection of the second processing component; and
   causing the second processing component to generate the first output data.

2. The computer-implemented method of claim 1, further comprising:
   receiving second data corresponding to a second natural language input;
   determining a third plurality of processing components configured to generate second output data responsive to the second natural language input, the third plurality of processing components corresponding to the processing component type;
   determining, from the storage, a fourth rule indicating all but a fourth processing component, of the processing component type, are to be prevented from processing the second data;
   in response to the fourth rule and based on a plurality of rules corresponding to lower priority rules than the fourth rule, determining the plurality of rules are to be ignored with respect to processing of the second data; and
   causing the fourth processing component to generate the second output data.

3. The computer-implemented method of claim 1, further comprising:
sending the first data to the second processing component;
after sending the first data, receiving, from the second processing component, pre-response data representing the second processing component is capable of generating the first output data; and
causing the second processing component to generating the first output data further based at least in part on the pre-response data.

4. The computer-implemented method of claim 1, further comprising:
receiving, from a device, second data corresponding to a second natural language input;
determining a third plurality of processing components configured to generate second output data responsive to the second natural language input, the third plurality of processing components corresponding to the processing component type and comprising a fourth processing component and a fifth processing component;
determining, from the storage, a fourth rule indicating the fourth processing component is to be prevented from processing the second data;
storing third data associating the fourth processing component with an indicator representing the fourth processing component is to be prevented from processing the second data;
determining the fourth processing component is to process the second data; and
based on the fourth processing component being associated with the indicator, causing the device to indicate the second natural language input was unable to be processed.

5. A computer-implemented method comprising:
receiving first data representing a first natural language input;
determining a first plurality of processing components configured to generate first output data responsive to the first natural language input, the first plurality of processing components corresponding to a processing component type and comprising a first processing component and a second processing component;
determining a first rule indicating all but the first processing component, of the processing component type, are to be prevented from processing the first data;
determining a second rule indicating all but the second processing component, of the processing component type are to be prevented from processing the first data;
sending, to a device, a request for selection of the first processing component or the second processing component;
after sending the request, receiving, from the device, second data representing selection of the first processing component; and
causing the first processing component to generate the first output data.

6. The computer-implemented method of claim 5, further comprising:
determining a third rule representing a third processing component is to be prevented from processing the first data, the third rule corresponding to a lower priority rule than the first rule and the second rule; and
determining the first processing component is to generate the first output data further based at least in part on the third rule.

7. The computer-implemented method of claim 5, further comprising:
receiving second data representing a second natural language input;
determining a second plurality of processing components configured to generate second output data responsive to the second natural language input;
determining a third rule representing all but a third processing component, of the second plurality of processing components, are to be prevented from processing the second data;
determining a fourth rule corresponding to a lower priority rule than the third rule;
ignoring the fourth rule based at least in part on the third rule representing all but the third processing component, of the second plurality of processing components, are to be prevented from processing the second data and based at least in part on the fourth rule corresponding to the lower priority rule; and
causing the third processing component to generate the second output data.

8. The computer-implemented method of claim 5, further comprising:
sending the first data to the first processing component;
after sending the first data, receiving, from the first processing component, pre-response data representing the first processing component is able to generate the first output data; and
causing the first processing component is to generate the first output data further based at least in part on the pre-response data.

9. The computer-implemented method of claim 5, further comprising:
receiving second data representing a second natural language input;
determining a second plurality of processing components configured to generate second output data responsive to the second natural language input, the second plurality of processing components comprising a third processing component and a fourth processing component;
determining a third rule representing the third processing component is to be prevented from processing the second data;
storing third data associating the third processing component with an indicator representing the third processing component is to be prevented from processing the second data;
determining the third processing component is to process the second data; and
based on the third processing component being associated with the indicator, causing the device to indicate the second natural language input was unable to be processed.

10. The computer-implemented method of claim 5, further comprising:
receiving the first data from the device;
determining the device corresponds to a device type; and
determining the first rule based at least in part on the first rule corresponding to the device type.

11. The computer-implemented method of claim 5, further comprising:
receiving second data representing a second natural language input;
determining a second plurality of processing components configured to generate second output data responsive to the second natural language input;

determining a third rule representing all but a third processing component, of the second plurality of processing components, are to be prevented from processing the second data;
determining a fourth rule representing the third processing component is to be prevented from processing the second data;
ignoring the fourth rule based at least in part on the third rule representing all but the third processing component are to be prevented from processing the second data; and
causing the third processing component to generate the second output data.

12. A computing system comprising:
at least one processor; and
at least one memory comprising instructions that, when executed by the at least one processor, cause the computing system to:
receive first data representing a first natural language input;
determine a first plurality of processing components configured to generate first output data responsive to the first natural language input, the first plurality of processing components corresponding to a processing component type and comprising a first processing component and a second processing component;
determine a first rule indicating all but the first processing component, of the processing component type, are to be prevented from processing the first data;
determine a second rule indicating all but the second processing component, of the processing component type, are to be prevented from processing the first data;
send, to a device, a request for selection of the first processing component or the second processing component;
after sending the request, receive, from the device, second data representing selection of the first processing component; and
cause the first processing component to generate the first output data.

13. The computing system of claim 12, wherein the at least one memory further comprises instructions that, when executed by the at least one processor, further cause the computing system to:
determine a third rule representing a third processing component is to be prevented from processing the first data, the third rule corresponding to a lower priority rule than the first rule and the second rule; and
determine the first processing component is to generate the first output data based at least in part on the third rule.

14. The computing system of claim 12, wherein the at least one memory further comprises instructions that, when executed by the at least one processor, further cause the computing system to:
receive second data representing a second natural language input;
determine a second plurality of processing components configured to generate second output data responsive to the second natural language input;
determine a third rule representing all but a third processing component, of the second plurality of processing components, are to be prevented from processing the second data;
determine a fourth rule corresponding to a lower priority rule than the second rule;
ignore the fourth rule based at least in part on the third rule representing all but the third processing component, of the second plurality of processing components, are to be prevented from processing the second data and based at least in part on the fourth rule corresponding to the lower priority rule; and
cause the third processing component to generate the second output data.

15. The computing system of claim 12, wherein the at least one memory further comprises instructions that, when executed by the at least one processor, further cause the computing system to:
send the first data to the first processing component;
after sending the first data, receive, from the first processing component, pre-response data representing the first processing component is able to generate the first output data; and
cause the first processing component is to generate the first output data further based at least in part on the pre-response data.

16. The computing system of claim 12, wherein the at least one memory further comprises instructions that, when executed by the at least one processor, further cause the computing system to:
receive second data representing a second natural language input;
determine a second plurality of processing components configured to generate second output data responsive to the second natural language input, the second plurality of processing components comprising a third processing component and a fourth processing component;
determine a third rule representing the third processing component is to be prevented from processing the second data;
store third data associating the third processing component with an indicator representing the third processing component is to be prevented from processing the second data;
determine the third processing component is to process the second data; and
based on the third processing component being associated with the indicator, cause the device to indicate the second natural language input was unable to be processed.

17. The computing system of claim 12, wherein the at least one memory further comprises instructions that, when executed by the at least one processor, further cause the computing system to:
receive the first data from the device;
determine the device corresponds to a device type; and
determine the first rule based at least in part on the first rule corresponding to the device type.

18. The computing system of claim 12, wherein the at least one memory further comprises instructions that, when executed by the at least one processor, further cause the computing system to:
receive second data representing a second natural language input;
determine a second plurality of processing components configured to generate second output data responsive to the second natural language input;
determine a third rule representing all but a third processing component, of the second plurality of processing components, are to be prevented from processing the second data;

determine a fourth rule representing the third processing component is to be prevented from processing the second data;
ignore the fourth rule based at least in part on the second rule representing all but the third processing component are to be prevented from processing the second data; and
cause the third processing component to generate the second output data.

* * * * *